(12) United States Patent
Strickland et al.

(10) Patent No.: US 11,602,971 B2
(45) Date of Patent: Mar. 14, 2023

(54) MECHANICAL BYPASS OF ELECTRONIC VALVE BODY

(71) Applicant: Fox Factory, Inc., Duluth, GA (US)

(72) Inventors: Rick Strickland, Dacula, GA (US); Jeff Halper, Santa Cruz, CA (US); Mike Labbe, Scotts Valley, CA (US)

(73) Assignee: Fox Factory, Inc., Duluth, GA (US)

(*) Notice: Subject to any disclaimer, the term of this patent is extended or adjusted under 35 U.S.C. 154(b) by 212 days.

(21) Appl. No.: 16/798,171

(22) Filed: Feb. 21, 2020

(65) Prior Publication Data
US 2020/0269647 A1 Aug. 27, 2020

Related U.S. Application Data

(60) Provisional application No. 62/809,447, filed on Feb. 22, 2019.

(51) Int. Cl.
| | |
|---|---|
| *B60G 17/052* | (2006.01) |
| *B60G 17/08* | (2006.01) |
| *F16F 9/32* | (2006.01) |
| *F16K 17/04* | (2006.01) |
| *F16F 9/34* | (2006.01) |

(52) U.S. Cl.
CPC ......... *B60G 17/0528* (2013.01); *B60G 17/08* (2013.01); *F16F 9/325* (2013.01); *F16F 9/34* (2013.01); *F16K 17/048* (2013.01); *F16K 17/0486* (2013.01); *B60G 2500/204* (2013.01)

(58) Field of Classification Search
CPC ............... B60G 17/0528; B60G 17/08; B60G 2500/204; F16F 9/325; F16F 9/34; F16K 17/048; F16K 17/0486

USPC ............ 280/124.157, 124.159, 124.16
See application file for complete search history.

(56) References Cited

U.S. PATENT DOCUMENTS

| | | | |
|---|---|---|---|
| 3,986,118 A | 10/1976 | Madigan | |
| 5,952,823 A | 9/1999 | Sprecher et al. | |
| 6,029,958 A | 2/2000 | Larsson et al. | |
| 6,446,771 B1 | 9/2002 | Sintorn et al. | |
| 7,374,028 B2 | 5/2008 | Fox | |
| 8,550,223 B2 * | 10/2013 | Cox ........... | B60G 17/08 188/322.22 |
| 8,627,932 B2 | 1/2014 | Marking | |
| 8,857,580 B2 | 10/2014 | Marking | |
| 9,033,122 B2 | 5/2015 | Ericksen et al. | |
| 9,120,362 B2 | 9/2015 | Marking | |
| 9,239,090 B2 | 1/2016 | Marking et al. | |

(Continued)

OTHER PUBLICATIONS

"The Lee Company Technical Hydraulic Handbook", 1996, 1-696.

*Primary Examiner* — Toan C To

(57) ABSTRACT

A mechanical bypass for a shock assembly is disclosed herein. The assembly has a damper chamber having a compression portion and a rebound portion. There is further an external reservoir in fluid communication with the rebound portion of the damper chamber via a flow path. A valve is coupled with the flow path, the valve to meter a flow of the working fluid through the flow path. A bypass port to the external reservoir is provided in the flow path and bypasses the valve. A mechanical relief valve is provided in the bypass port to block a fluid flow though the bypass port until a blow-off pressure that is higher than a normal operating pressure and less than a burst pressure of the damping chamber is provided thereon.

18 Claims, 14 Drawing Sheets

(56) References Cited

U.S. PATENT DOCUMENTS

| | | |
|---|---|---|
| 9,353,818 B2 | 5/2016 | Marking |
| 11,306,798 B2* | 4/2022 | Cox ....................... F16F 9/3214 |
| 2005/0104320 A1* | 5/2005 | Wesling .................. F16F 9/003 |
| | | 280/276 |
| 2011/0067965 A1* | 3/2011 | McAndrews ........... F16F 9/504 |
| | | 188/275 |
| 2011/0315494 A1* | 12/2011 | Marking ................. F16F 9/516 |
| | | 188/313 |
| 2012/0255822 A1* | 10/2012 | Ito .......................... F16F 9/325 |
| | | 188/322.15 |
| 2013/0228404 A1* | 9/2013 | Marking ................... F16F 9/19 |
| | | 188/266.2 |
| 2014/0265203 A1* | 9/2014 | Zuleger ................. F16F 9/3482 |
| | | 280/124.16 |
| 2016/0059664 A1* | 3/2016 | Tucker ................... B60G 17/08 |
| | | 280/124.159 |
| 2018/0216692 A1* | 8/2018 | Coaplen ................. F16F 9/348 |
| 2019/0390730 A1* | 12/2019 | Russell ................ B60G 13/008 |
| 2021/0088100 A1* | 3/2021 | Woelfel ................. F16F 9/065 |

* cited by examiner

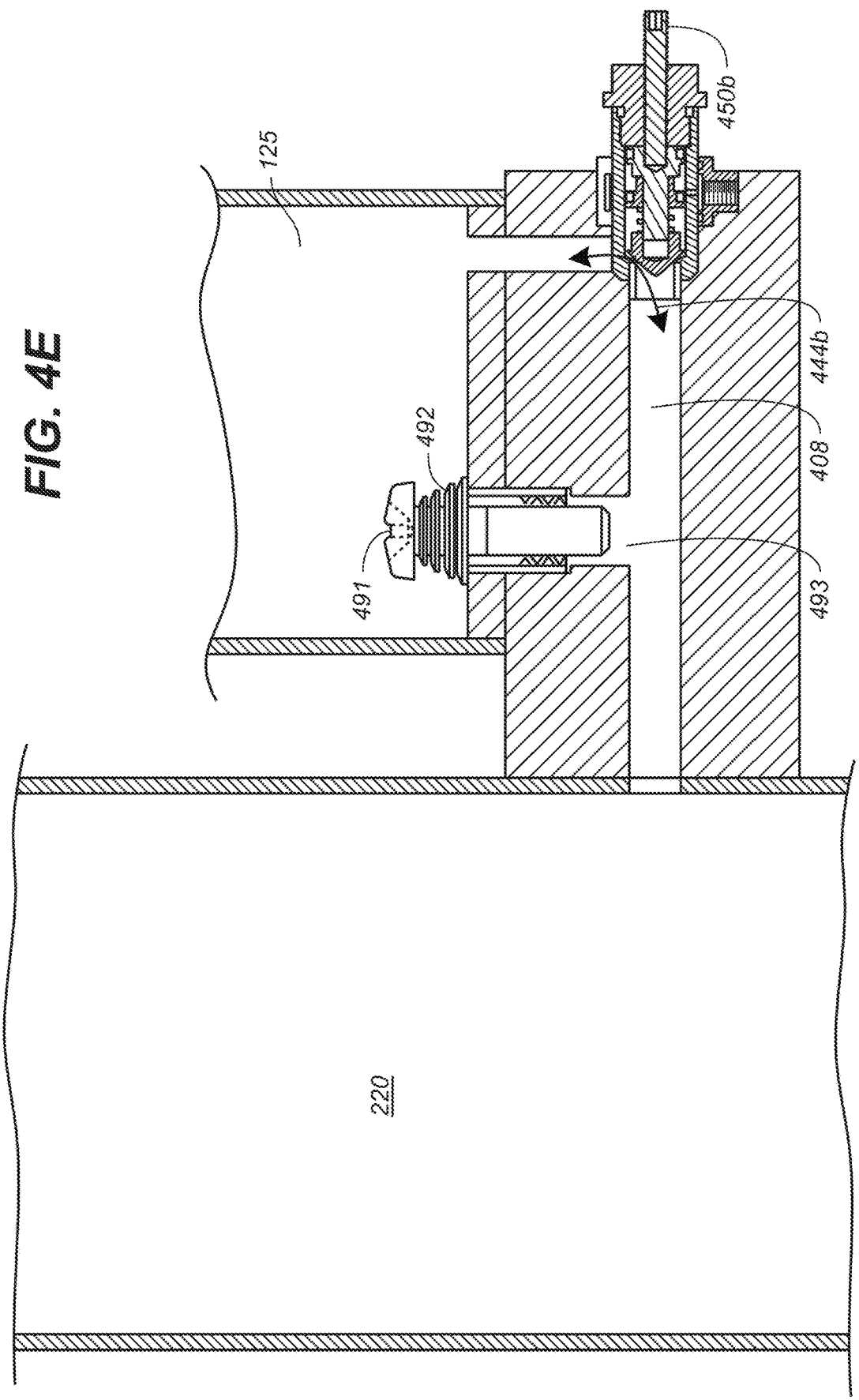

MECHANICAL BYPASS OF ELECTRONIC VALVE BODY

CROSS-REFERENCE TO RELATED APPLICATIONS (PROVISIONAL)

This application claims priority to and benefit of U.S. Provisional Patent Application No. 62/809,447 filed on Feb. 22, 2019, entitled "MECHANICAL BYPASS OF ELECTRONIC VALVE BODY" by Strickland et al., and assigned to the assignee of the present application, the disclosure of which is hereby incorporated by reference in its entirety.

FIELD OF THE INVENTION

Embodiments of the invention generally relate to methods and apparatus for use in vehicle suspension. Particular embodiments of the invention relate to methods and apparatus useful for vehicle shock absorbers.

BACKGROUND OF THE INVENTION

Vehicle suspension systems typically include a spring component or components and a damping component or components that form a suspension to provide for a comfortable ride, enhance performance of a vehicle, and the like. for example, a hard suspension is important on a racetrack while a soft suspension is nice for driving to the grocery store. Travel in the suspension can also be modified depending upon the terrain. For example, a trip to the grocery store does not call for a lot of suspension travel, but for a drive down a fire road that includes lots of different bumps, holes, ruts, washboards, etc. a longer suspension travel would make the ride more enjoyable, reduce the damage that the rough terrain transferred to the vehicle frame, and provide increased traction and speed capabilities. Thus, the suspension system is almost always a collection of compromises to obtain the best performance over the range of different possible encounters. However, as with every collection of compromises, an advancement in one area almost always incurs a new problem or set of problems that require further advancement, analysis, and invention.

BRIEF DESCRIPTION OF THE DRAWINGS

FIG. 4E is a section view similar to any of FIGS. 4A-4D that also includes a mechanical bypass to the reservoir, in accordance with an embodiment.

Figure 1:
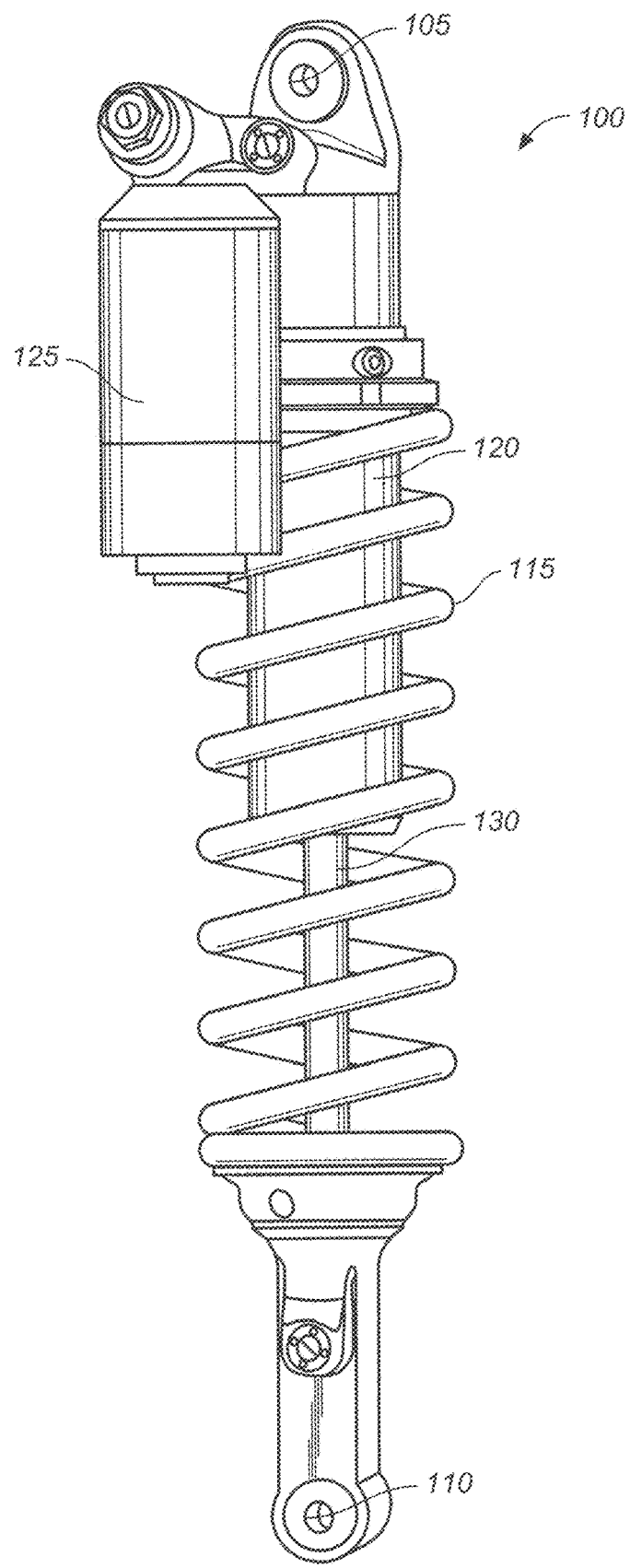
FIG. 1 is a perspective view of a rear shock absorber including a damper, external reservoir and helical spring.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Further, in the following discussion, the term "active", as used when referring to a valve or damping component, means adjustable, manipulatable, etc., during typical operation of the valve. For example, an active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, an active valve may also be configured to automatically adjust its operation, and corresponding damping characteristics, based upon, for example, operational information pertaining to the vehicle and/or the suspension with which the valve is used. Similarly, it will be understood that in some embodiments, an active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle. Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

FIG. 1 is a perspective view of a shock absorber 100. The shock absorber of FIG. 1 includes a helical spring 115, a damper housing 120 with a piston and chamber (not shown) and an external reservoir 125 having a floating piston (not shown) and pressurized gas to compensate for a reduction in volume in the main damper chamber of the shock absorber as the piston shaft 130 moves into the damper body. Fluid communication between the main chamber of the damper and the external reservoir 125 may be via a flow channel including an adjustable needle valve. In its basic form, the damper works in conjunction with the helical spring and controls the speed of movement of the piston shaft by metering incompressible fluid from one side of the damper piston to the other, and additionally from the main chamber to the reservoir, during a compression stroke (and in reverse during the rebound or extension stroke).

In one example, illustrated in U.S. Pat. No. 6,446,771 (which patent is incorporated by reference herein in its entirety), a shock absorber includes an additional piston located at an end of the piston shaft and designed to enter a completely closed cup-shaped member as the shock absorber approaches complete compression. The arrangement adds an additional fluid metering damping piston and therefore additional damping, as the shock nears the end of its stroke.

U.S. Pat. No. 6,029,958, which is also incorporated by reference herein in its entirety, provides an increase in damping as the shock is compressed by using a pin and hole arrangement. As illustrated in FIG. 1 of the '958 patent, the piston has an aperture formed in its center and the aperture serves as a fluid path during a first portion of the shock's compression stroke. As the piston moves nearer the bottom out position, a pin mounted at a bottom end of the damper chamber contacts the aperture and prevents further fluid communication. In this manner, damping is increased by eliminating a metering path for the fluid.

Figure 2:
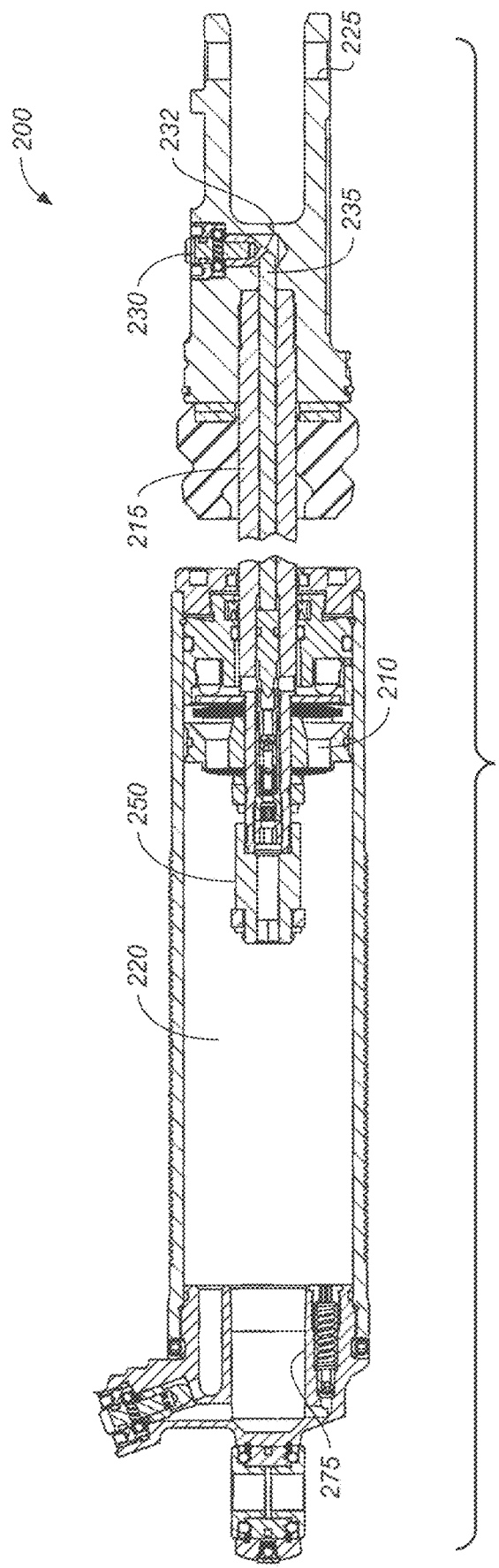
FIG. 2 is a section view showing a shock absorber with a damping assembly having a secondary, bottom out damping assembly.

FIG. 2 is a section view showing a damping assembly 200 of a shock absorber shown in an axially extended position. A damping piston 210 is fixed relative to a shaft 215, both of which are axially movable relative to a housing or chamber 220. The piston 210 is equipped with fluid paths therethrough to permit damping fluid within the chamber 220 to be metered through the piston 210. For example, when the shaft 215 moves into the chamber 220, fluid moves from a first side (the compression portion) to an opposite side (the rebound portion) of the chamber 220 through the paths formed in the piston 210. Additionally, fluid must move through a flow path from the chamber 220 into the external reservoir 125, thereby causing a reservoir floating piston to compress a gas chamber in the external reservoir 125. A configuration of a side reservoir, including a floating piston, is described in U.S. Pat. No. 7,374,028 which patent is entirely incorporated herein by reference.

Also visible in FIG. 2 is a bottom out control feature. In one embodiment, the bottom out control feature utilizes a bottom out piston 250 connected at the end of the shaft 215 and spaced from the damping piston 210. The bottom out piston is constructed and arranged to engage a bottom out cup 275 formed at the lower end of the chamber 220. As will be explained herein in more detail, the bottom out cup and bottom out piston operate with various damping devices including a pressure relief or "blow-off" valve and an active valve to provide bottom out control.

However, various bottom out control features (both similar to the bottom out cup described herein, and using other bottom out control layouts, parts, systems, etc.) have been utilized in different shock set-ups such as those discussed in mountain bike forums, shock setup forums, and patents including U.S. Pat. No. 8,550,223 which is incorporated herein by reference in its entirety. However, the utilization of an active valve 350 to control any type of fluid flow pathways in a bottom out control feature has not been implemented prior to this disclosure. Moreover, the active valve 350, although described herein in a method of operation and design is not limited to the embodiment of a bottom out control feature using a bottom out cup, but could be easily added to any fluid flow pathway(s) that are a part of a bottom out control feature, system, or setup.

Example Active Bottom Out Valve

The active valve 350, in accordance with embodiments, includes a nipple 370, a body 355, and mating threads 390.

In brief, body 355 is rotationally engaged with the nipple 370. A male hex member extends from an end of the body 355 into a female hex profile bore formed in the nipple 370. Such engagement transmits rotation from the body 355 to the nipple 370 while allowing axial displacement of the nipple 370 relative to the body 355. Therefore, while the body does not axially move upon rotation, the threaded nipple 370 interacts with mating threads 390 formed on an inside diameter of the bore to transmit axial motion, resulting from rotation and based on the pitch of the threads 390, of the nipple 370 towards and away from an orifice 400 and between a closed and fully open positions. Of note, depending on the movement of the body 355, the nipple 370 may occupy a position within respect to orifice 400 such that nipple 370 completely blocks orifice 400, partially blocks orifice 400, or does not block orifice 400 at all.

For example, active valve 350, when open, permits a first flow rate of the working fluid through orifice 400. In contrast, when active valve 350 is partially closed, a second flow rate of the working fluid though orifice 400 occurs. The second flow rate is less than the first flow rate but greater than no flow rate. When active valve 350 is completely closed, the flow rate of the working fluid though orifice 400 is statistically zero.

In one embodiment, instead of (or in addition to) restricting the flow through orifice 400, active valve 350 can vary a flow rate through an inlet or outlet passage within the active valve 350, itself. See, as an example, the electronic valve of FIGS. 2-4 of U.S. Pat. No. 9,353,818 which is incorporated by reference herein, in its entirety, as further example of different types of "electronic" or "active" valves). Thus, the active valve 350, can be used to meter the working fluid flow (e.g., control the rate of working fluid flow) with/or without adjusting the flow rate through orifice 400.

As can be seen in FIGS. 2-4E, due to the active valve 350 (or 450) arrangement, a relatively small solenoid (using relatively low amounts of power) can generate relatively large damping forces. Furthermore, due to incompressible fluid inside the damping assembly 200, damping occurs as the distance between nipple 370 and orifice 400 is reduced. The result is a controllable damping rate. Certain active valve features are described and shown in U.S. Pat. Nos. 9,120,362; 8,627,932; 8,857,580; 9,033,122; and 9,239,090 which are incorporated herein, in their entirety, by reference.

It should be appreciated that when the body 355 rotates in a reverse direction than that described above and herein, the nipple 370 moves away from orifice 400 providing at least a partially opened fluid path.

Figure 3A:
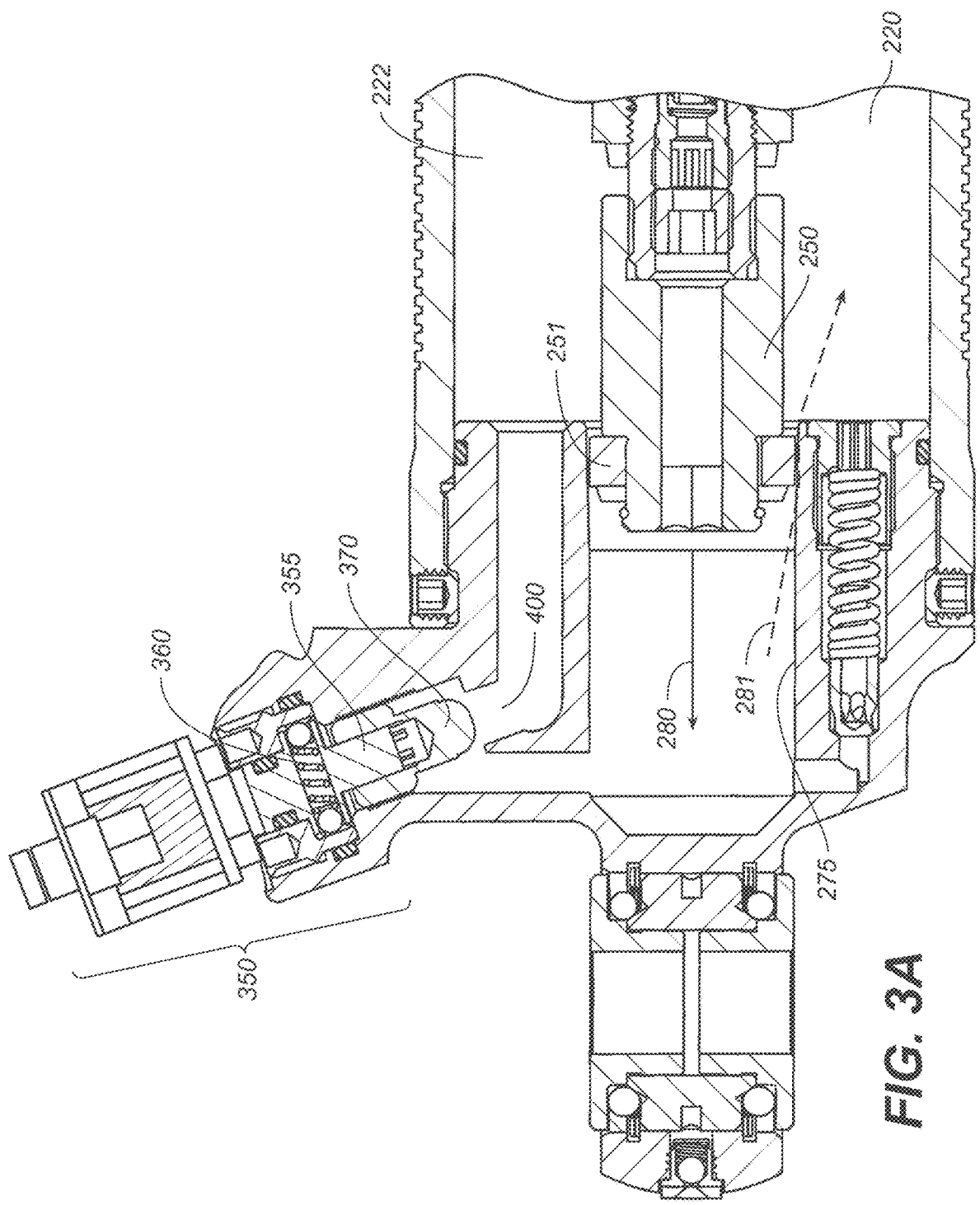
FIG. 3A is a section view showing a bottom out piston entering a bottom out cup during a compression stroke of a shock absorber.

FIG. 3A is a section view showing the bottom out piston 250 entering the bottom out cup 275 during a compression stroke of the shock absorber. The direction of movement of the piston 250 is illustrated by arrow 280. The bottom out piston includes a piston ring or piston seal 251 for axially slideable engagement with an inner diameter of the bottom out cup 275. In the embodiment of FIG. 3A, the upper end of the bottom out cup has a diameter that tapers outwards (i.e. larger) permitting, initially in the stroke, some fluid to pass through an annular area formed between the bottom out piston seal 251 and the inner diameter of the cup 275. The piston by-pass flow of fluid through the annular area and into a compression portion 222 of chamber 220 is illustrated by arrow 281.

Figure 3B:
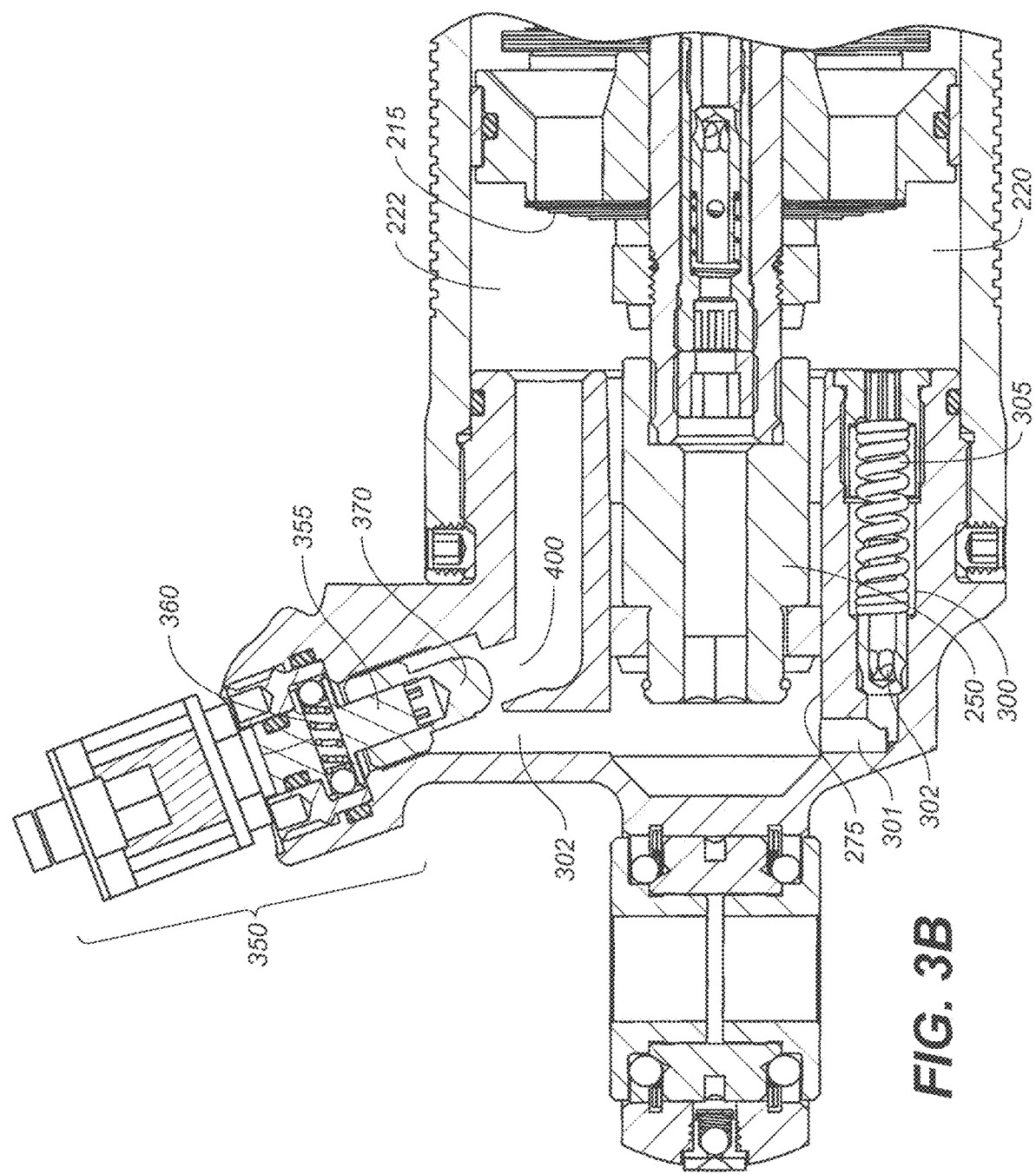
FIG. 3B is a section view showing the bottom out cup of FIG. 3A with the bottom out piston fully engaged and sealed therein.

FIG. 3B is a section view showing the bottom out cup 275 of FIG. 3A with the bottom out piston 250 fully engaged therein. As the piston completely engages the cup 275, damping is increased because the shaft 215 can only progress further as fluid (e.g. substantially incompressible) is moved from the bottom out cup through one of two flow paths (e.g., flow path 301, and flow path 302) leading back into the compression portion 222 of chamber 220 (and ultimately also into external reservoir 125 if one is used).

FIG. 3B also shows various adjustable damping mechanisms that work in conjunction with the bottom out cup and piston. At an end of flow path 301 is a pressure relief or "blow-off" valve 300, a high-speed compression circuit that operates at a blow-off threshold, typically due to a relatively rapid event like the rapid compression of the shock absorber. The blow-off valve 300 selectively allows fluid flow from the bottom out cup 275 to the compression portion 222 of chamber 220 at shaft speeds (in the direction of arrow 280) that create fluid pressures within the bottom out cup above the blow-off threshold pressure during engagement of piston 250 with bottom out cup 275. The blow-off valve generally includes a valve opening, a blow-off valve 300 (or piston) and a compression spring 305. The blow-off pressure is determined by a combination of the spring rate of the spring 305, the preload on the spring 305 and the area of the blow-off valve 300 that is subject to fluid pressure from the bottom out cup 275. When fluid pressure in the cup rises above the predetermined (e.g. preset) threshold, the piston is forced away from the piston seat and allows fluid to flow through the valve opening and into the compression portion 222, thus lowering the pressure within the bottom out cup 275. The blow-off valve 300 is primarily a safety device and is typically set to crack or "blow-off", thereby allowing fluid flow into the compression portion of chamber 220, at a pressure that is relatively high but still low enough to prevent excess pressure build up in the bottom out cup 275 from damaging the shock or the vehicle in which the shock is integrated.

Figure 3C:
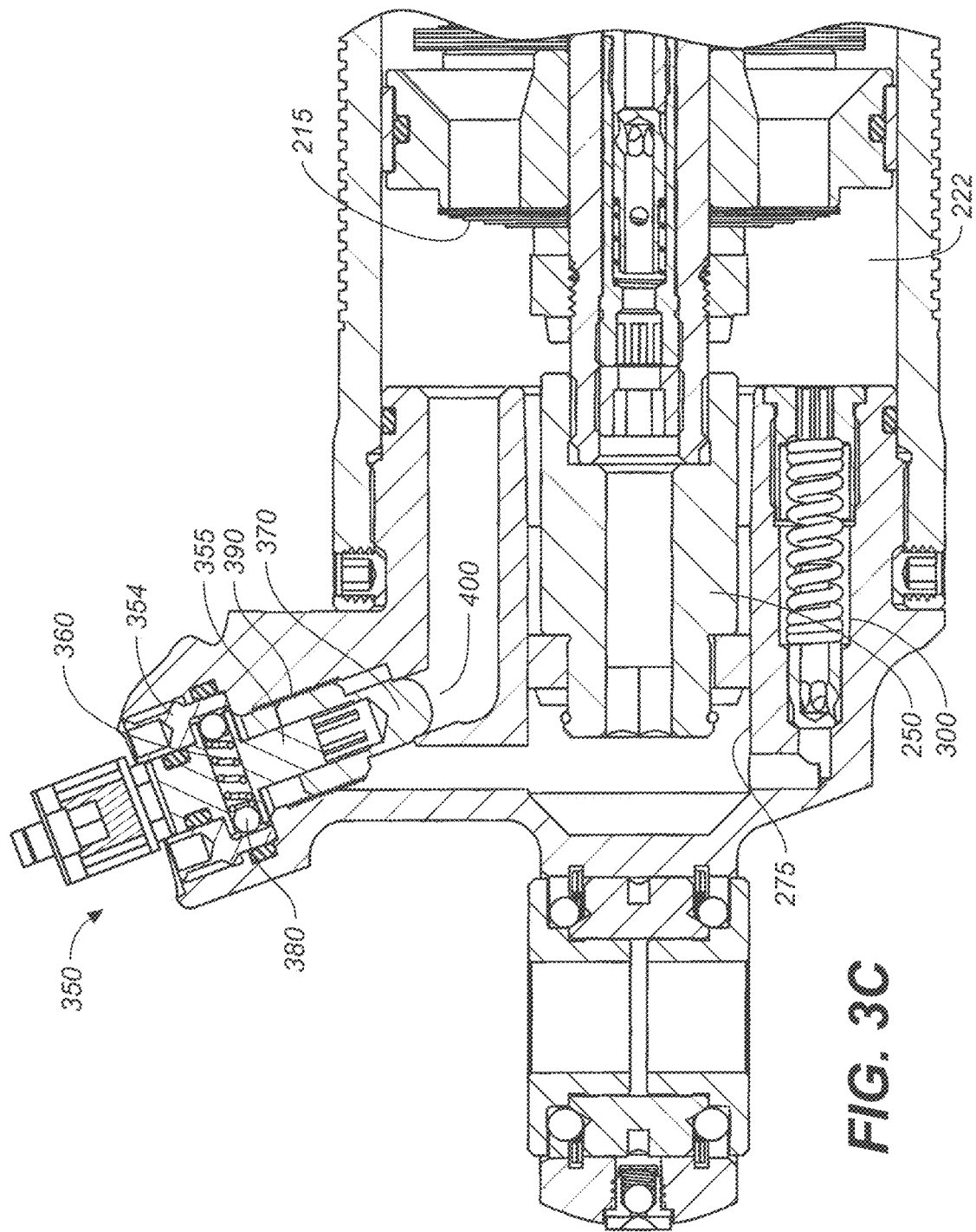
FIG. 3C is a section view of the bottom out cup of FIGS. 3A & 3B showing a blow-off valve and an active valve in communication with the bottom out cup.
Figure 3D:
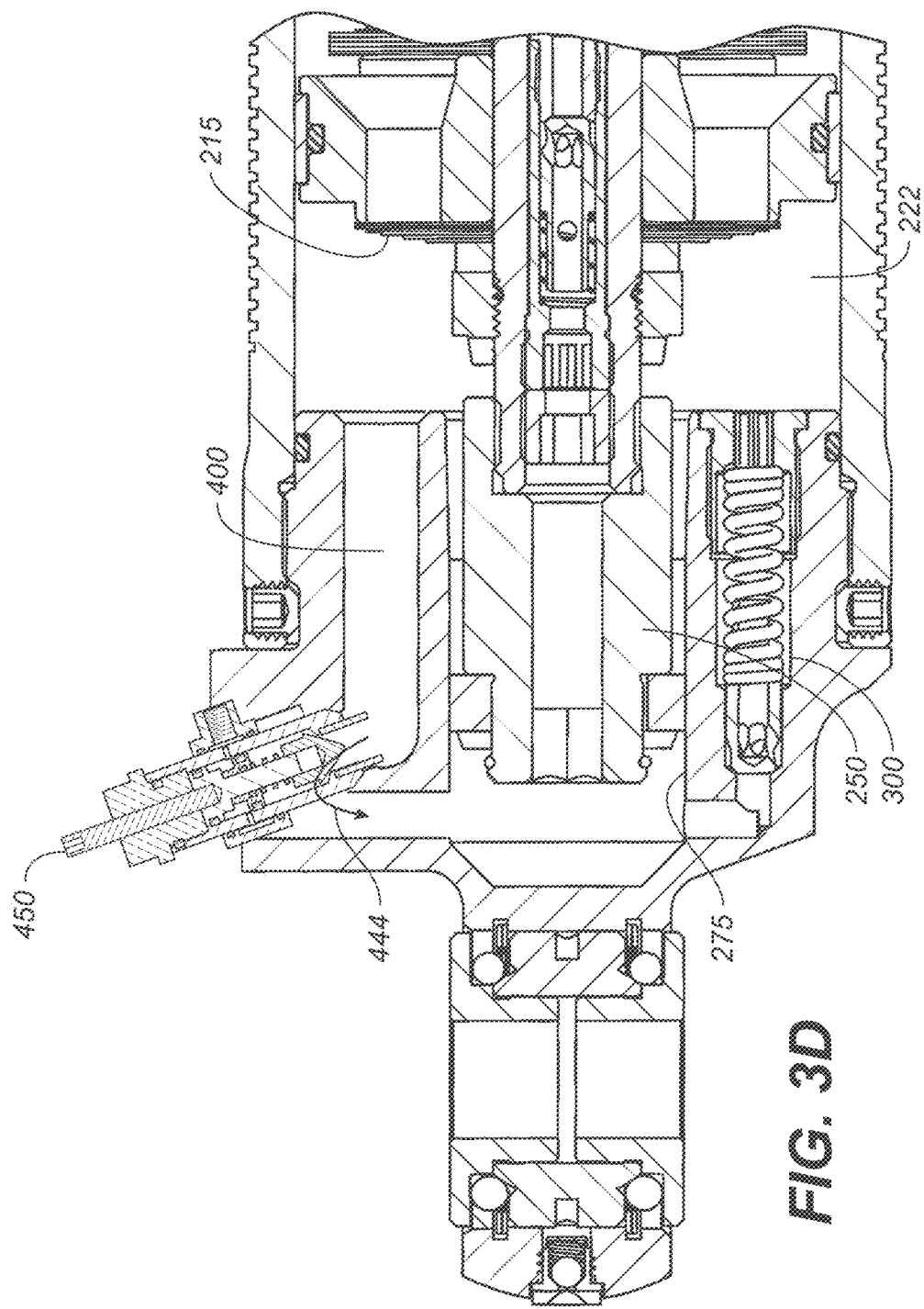
FIG. 3D is a similar view as shown in FIG. 3C showing a blow-off valve and an active valve having a second configuration in communication with the bottom out cup.

Visible in FIGS. 3A-D, at an end of fluid flow path 302 is an active valve 350. Active valve 350 is operable to provide an easily and readily adjustable damping feature operable with the bottom out cup 275 and piston 250. In FIGS. 3A-B the active valve 350 is shown in an open position whereby fluid may flow through an orifice 400. In FIGS. 3C-D, the valve is shown in a closed position wherein orifice 400 is fully obstructed. The active valve 350 is disposed in a bore formed in the damper housing cap. The active valve 350 assembly consists of a solenoid 506 (of FIG. 5), body 355, nipple 370, and mating threads 390.

In one embodiment, the active valve 350 is a live valve. That is, one or more of components of active valve 350 (e.g., body 355, nipple 370, mating threads 390, or the like) will be actuated automatically based on actual terrain conditions. In operation of the active valve 350, a solenoid electronically turns body 355. As body 355 is turned, the indexing ring 360 consisting of two opposing, outwardly spring-biased balls 380 rotates among indentions formed on an inside diameter of a lock ring 354. The interaction between the balls and the indentions locks the body 355 at each rotational location until the balls 380 are urged out of the indentations by additional rotational force input provided to body 355. The result is that the body 355 will index at various points of its rotation so that positioning of the body 355, and the corresponding setting of active valve 350, is maintained against vibration of the shock and the vehicle while in use.

As the body 355 rotates, so does the valve or nipple 370 at an opposite end of the valve from the head. The body 355 is rotationally engaged with the nipple 370. A male hex member extends from an end of the body 355 into a female hex profile bore formed in the nipple 370. Such engagement transmits rotation from the body 355 to the nipple 370 while allowing axial displacement of the nipple 370 relative to the body 355. Therefore, while the body does not axially move upon rotation, the threaded nipple 370 interacts with mating threads 390 formed on an inside diameter of the bore to transmit axial motion, resulting from rotation and based on the pitch of the threads 390, of the nipple 370 towards and away from an orifice 400 and between a closed and fully open positions.

In one embodiment, the live operation includes an active signal received by a receiver at active valve 350 from a computing device. For example, the user would have an app on a smart phone (or other computing device) and would control the settings via the app. Thus, when the user wanted to adjust the flowrate of the fluid through orifice 400, they would provide the proper command from the computing device and it would be received at active valve 350 which would then automatically operate body 355 causing nipple 370, to close, open, partially close, or partially open orifice 400 to meter the fluid flow.

In operation, the blow-off valve 300 and active valve 350 operate independently of each other but each is designed to permit fluid to pass from the bottom out cup 275 to the compression portion 222 of the chamber 220 in order to lessen the increase in damping effect (i.e. the "increase" being over that due to the piston 210 and the external reservoir 125 during the majority of the compression stroke) when the bottom out piston 250 engages the bottom out cup. Even when active valve 350 is completely closed with no fluid entering the compression portion of the chamber through the metering active valve 350 (i.e. the bottom out damping rate is very high), the damping rate will decrease to some extent when a threshold pressure of blow-off valve 300 is reached, thereby opening blow-off valve 300 and allowing fluid to flow from the bottom out cup 275 to the compression portion of the chamber 220 via flow path 302 and independently of orifice 400.

FIG. 3D is a similar view as shown in FIG. 3C showing a blow-off valve and an active valve having a second configuration in communication with the bottom out cup. FIG. 3D illustrates a section view similar to that of FIG. 3C. As such, and for purposes of clarity, only the differences between FIGS. 3C-3D will be discussed.

FIG. 3D shows an active valve that is operable to provide an easily and readily adjustable damping feature operable with the bottom out cup 275 and piston 250 with another embodiment of an active valve 450 (as shown in detail in FIG. 7) which is a different configuration than active valve 350, but which operates in the same overall manner and with the same processes as described with respect to FIGS. 3A-C, except that the control of the fluid flow is performed through active valve 450 as it passes through orifice 400.

Figure 4A:
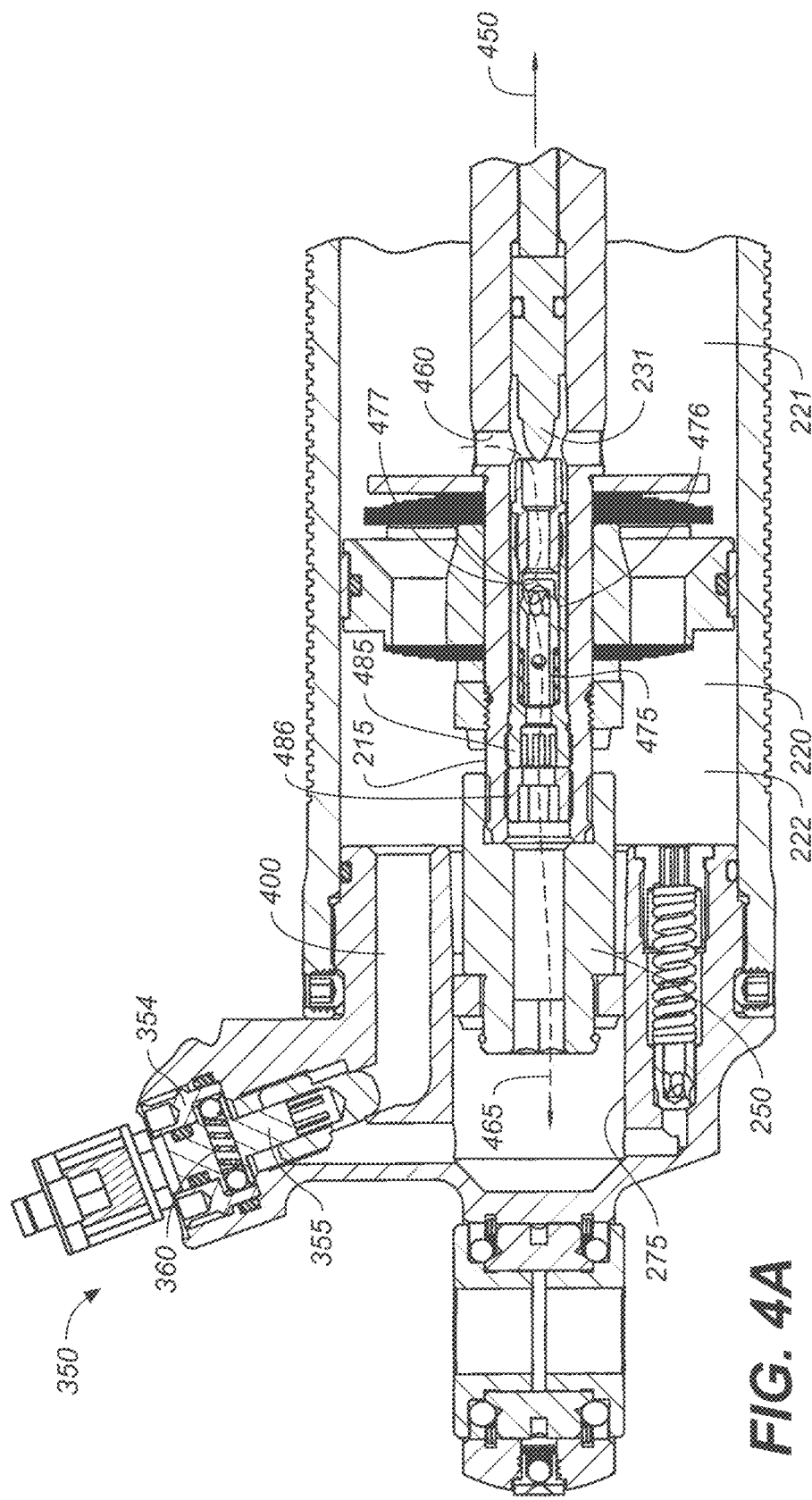
FIG. 4A is a section view showing the bottom out piston being removed from the cup and a piston shaft having a fluid path formed in its interior for providing fluid communication between the bottom out cup and the rebound portion of the damping chamber during the rebound stroke.

FIG. 4A is a section view showing the shaft 215 with another damping mechanism operable in conjunction with the bottom out cup 275 and piston 250 and also to operate prior to engagement of the piston in the cup. As indicated by movement direction arrow 465 in FIG. 4A, the bottom out piston 250 is shown being removed from the bottom out cup 275. In the embodiment of FIG. 4A, the shaft 215 includes a fluid path formed in its interior and provides for fluid communication between the bottom out cup 275 and a rebound portion 221 of the chamber 220 during the rebound stroke. The path and direction of flow in the embodiment is illustrated by arrow 465. The path winds through a bore in the shaft that is formed coaxially with the centerline of the shaft. At one end, the fluid path including 475, terminates at a lower end of the bottom out piston 250 and at an upper end, the path terminates at an aperture(s) 460 intersecting the path designated by arrow 465 and leading into the chamber 220.

An adjustment mechanism described herein in relation to FIG. 2, and terminating in bullet shaped member (e.g. adjustable needle valve) 231 permits the volume of fluid flow, upon opening of the check valve 475, to be set by a user. As shown in FIG. 2, shaft 215 includes a mounting eye 225 (or clevis) at one end thereof. The mounting eye 225 includes a valve adjuster 230 which is user-adjustable and movable in and out (e.g. by threaded engagement) of the eye in a direction substantially perpendicular to the longitudinal axis of shaft 215. Shaft 215 also includes a coaxially mounted shaft 235 therein, where shaft 235 is axially movable relative to shaft 215. An end 232 of valve adjuster 230 contacts an end of shaft 235 and rotational movement of valve adjuster 230 causes axial movement of shaft 235 relative to shaft 215. Such axial movement of shaft 235 changes the position of a needle valve 231 inside the shaft and thereby adjusts the low speed fluid flow rate and maximum fluid flow rate though the piston shaft (in the direction that is not blocked by a check valve 475) and thereby allows manual adjustment of the damping rate.

In addition to a fluid path, the shaft 215 of the embodiment is provided with an adjustable and reversible check valve 475 installed at an upper end of the path and permitting fluid to selectively move in one direction while preventing fluid from moving in an opposite direction. In the embodiment shown in FIG. 4A, fluid is only permitted to move toward the lower end of the bottom out piston 250 (as indicated by arrow 465) and is checked in the reverse direction. The check valve 475 is spring loaded to open at a predetermined (set) fluid pressure in the direction of permitted flow (the direction shown by arrow 465). Varying spring preload will vary the fluid pressure at which the check valve is set to crack.

In one embodiment, as shown, damping of the shock absorber is reduced in the extending or rebound direction, because the fluid flow through the shaft permits a quicker extension or "rebound" of the shaft by permitting an additional volume of fluid to move from the rebound portion 221 of the chamber 220 to the region below the bottom out piston 250 (which, following bottom out, flows into the bottom out cup below piston 250), thus reducing force required to retract the bottom out piston 250 from the cup 275 and therefore, the shaft 215 and permitting a quicker extension. In another embodiment, not shown, the check valve 475 is reversed and damping on the compression stroke is reduced by the allowance of additional fluid flow through the shaft 215 and along path designated by arrow 465 but in an opposite direction from the one shown in FIG. 4A as direction of arrow 465. Reversing the check valve from the shown embodiment results in the valve member 476 and seat 477 being oriented towards the bottom out piston.

In order to facilitate easy reversal and adjustment of the check valve, the bore of shaft 215 is provided with threads to accept a check valve cartridge 485. The check valve cartridge 485 is further secured within the shaft 215 by a threaded nut 486. The check valve cartridge 485 and the nut 486 are flush or below flush relative to the lower end of the shaft 215 and fit therein without additional shaft diameter or length, so that there is no interference with the interface between or operation or assembly of the piston 250 and the shaft 215. The shaft 215 having the provision for a modular check valve cartridge 485 allows for other interchangeable valve configurations without modifying surrounding hardware. For instance, the check valve cartridge 485 may be equipped with fluid flow resistors (chokes), filters or other micro-fluidic devices as, for example, are illustrated in The Lee Company Technical Hydraulic Handbook, which is copyright 1996 by The Lee Company and entirely incorporated by reference herein, or any suitable combination of the foregoing as may be desirable for the tailoring of flowing fluid characteristics. Further, the inclusion of such cartridge check valve requires no additional length in the overall shaft 215/piston 250 assembly.

In one embodiment the damping assembly 200 and bottom out feature are configured and operated, at the user's discretion, without the check valve 475 (or check valve cartridge 485) installed. In that embodiment fluid may flow along the path designated by arrow 465 in either direction, thereby reducing damping characteristics in both the rebound and compression strokes to the extent allowed by adjustment of the needle valve 231. Alternatively, the needle valve may be completely closed into an adjacent end of check valve cartridge 485 thereby excluding fluid flow in both directions along the path designated by arrow 465.

In one embodiment (not shown) the bottom out chamber or "cup" is located proximate an end of the damping chamber corresponding to the hole through which the shaft enters that chamber. A "bottom out piston" surrounds the shaft and is axially movable relative thereto (there though). The primary damping piston includes a connector which connects it to the bottom out piston and the connector is capable of bearing tension between the two pistons but not compression. A simple embodiment of such a connector may include a flexible cable. The bottom out piston is forced into the bottom out cup by direct engagement of the "topping out" primary damping piston at near full extension of the shock absorber. In extended positions of the shock absorber the connector between the primary and bottom out pistons is slack. As the shock absorber is compressed to near bottom out position, the connector is placed in tension and begins to pull the bottom out piston from within the bottom out cup thereby creating a suction (or vacuum) within the bottom out cup. The bottom out cup includes a metering valve, in principle as described herein, for metering fluid through a path between (into) an interior of the bottom out cup (such interior formed by the cup and the engaged bottom out piston) and (from) the rebound chamber thereby relieving the vacuum while creating an increased damping effect near bottom out. It is contemplated that the "bottom out cup" and "bottom out piston" may include many varied embodiments while retaining adjustability.

Each damping mechanism described is usable with a bottom out cup and piston to provide a variety of selectable and/or adjustable damping options in a shock absorber near the end of a compression stroke (and some throughout either stroke) or beginning of a rebound stroke. Embodiments described herein may also be adapted to work with dampers generally as if the bottom out piston 250 and the bottom out cup described herein where the damping piston and cylinder. For example, active valve 350 can be initially set to permit a predetermined amount of fluid to flow between the cup and the compression portion 222 chamber 220 of the vehicle damping assembly 200. The blow-off valve 300, depending upon its setting, permits fluid flow in the event that pressure in the cup exceeds the threshold pressure of the blow-off valve circuit. Operation of the blow-off valve is in part determinable by the setting of active valve 350 as its more or less metering of fluid operates to lessen or increase, respectively, the fluid pressure in the bottom out cup. Also, the reversible check valve 475 in the hollow shaft can be arranged to reduce damping in either the compression or the rebound stroke of the piston.

Referring still to FIGS. 3A-4E, in various embodiments of the present invention, damping assembly 200 includes a bottom out orifice 400 whose flow rate (or size of opening) is adjusted by the operation of nipple 370 of active valve 350, such that the flowrate of the fluid between the cup and the compression portion 222 of chamber 220 of the damper, via orifice 400 is automatically adjustable using active valve 350 to move nipple 370 closer to or further from orifice 400. In one such embodiment, active valve 350 is solenoid operated, hydraulically operated, pneumatically operated, or operated by any other suitable motive mechanism. Active valve 350 may be operated remotely by a switch or potentiometer located in the cockpit of a vehicle or attached to appropriate operational parts of a vehicle for timely activation (e.g. brake pedal) or may be operated in response to input from a microprocessor (e.g. calculating desired settings based on vehicle acceleration sensor data) or any suitable combination of activation means. In like manner, a controller for active valve 350 may be cockpit mounted and may be manually adjustable or microprocessor controlled or both or selectively either.

It may be desirable to increase the damping rate or effective stiffness of damping assembly 200 when moving a vehicle from off-road to on highway use. Off-road use often requires a high degree of compliance to absorb shocks imparted by the widely varying terrain. On highway use, particularly with long wheel travel vehicles, often requires more rigid shock absorption to allow a user to maintain control of a vehicle at higher speeds. This may be especially true during cornering or braking.

One embodiment is a four-wheeled vehicle having damping assembly 200 to automatically control the fluid flow between the cup and the compression portion 222 of chamber 220. As such, the damper is automatically adjustable using active valve 350 at each (of four) wheel.

For example, the opening size of orifice 400 which controls the flowrate of the fluid between the cup and the compression portion 222 of chamber 220 is automatically adjusted by active valve 350 (including, for example, a remotely controllable active valve). In one embodiment, each of the front shock absorbers may be electrically connected with a linear switch (such as that which operates an automotive brake light) that is activated in conjunction with the vehicle brake. When the brake is moved beyond a certain distance, corresponding usually to harder braking and hence potential for vehicle nose dive, the electric switch connects a power supply to a motive force generator for active valve 350 in the front shocks causes active valve 350 to automatically move body 355 and/or nipple 370 and cause nipple 370 to open, close, or partially close fluid flow through orifice 400.

In so doing, the reduction in fluid flow rate through orifice 400 increases the stiffness of that shock. As such, the front shocks become more rigid during hard braking. Other mechanisms may be used to trigger the shocks such as accelerometers (e.g. tri-axial) for sensing pitch and roll of the vehicle and activating, via a microprocessor, the appropriate amount of rotation of active valve 350 to cause nipple 370 to open, close, or partially close orifice 400 (and corresponding adjustment of the size of orifice 400 modifies the flowrate of the fluid between the cup and the compression portion 222 of chamber 220 for the corresponding damping assembly 200) for optimum vehicle control.

In one embodiment, a vehicle steering column includes right turn and left turn limit switches such that a hard turn in either direction activates the appropriate adjustment of active valve 350 to cause nipple 370 to open, close, or partially close orifice 400 (and corresponding adjustment of the size of orifice 400 modifies the flowrate of the fluid between the cup and the compression portion 222 of chamber 220 for the corresponding damping assembly 200) of shocks opposite that direction (for example, a hard, right turn would cause more rigid shocks on the vehicle's left side). Again, accelerometers in conjunction with a microprocessor (e.g., a comparer) and a switched power supply may perform the active valve 350 activation function by sensing the actual g-force associated with the turn (or braking; or acceleration for the rear shock activation) and triggering the appropriate amount of rotation of active valve 350 to cause nipple 370 to open, close, or partially close orifice 400 (and corresponding adjustment of the size of orifice 400 modifies the flowrate of the fluid between the cup and the compression portion 222 of chamber 220 for the corresponding damping assembly 200) at a predetermined acceleration threshold value (e.g., a g-force).

FIGS. 4B-4E each illustrate a section view similar to that of FIG. 4A. As such, and for purposes of clarity, only the differences between each of FIGS. 4B-4E will be discussed. In FIGS. 4B-4E, active valve 350 is replaced with another configuration of an active valve (e.g., active valve 450 described in detail in FIG. 7). FIGS. 4B-4E also include an external reservoir 125 that is in fluid communication with the chamber 220 for receiving and supplying working fluid as the piston 210 moves in and out of the chamber 220. The external reservoir 125 includes a reservoir cylinder 416 in fluid communication with the compression portion 222 of chamber 220 via the fluid conduit 408. The external reservoir 125 also includes a floating piston 414 with a volume of gas on a backside 418 ("blind end" side) of it, the gas being compressible as the reservoir cylinder 416, on the "frontside" 412 fills with working fluid due to movement of the piston 210 into the chamber 220. Certain features of reservoir type dampers are shown and described in U.S. Pat. No. 7,374,028, which is incorporated herein, in its entirety, by reference.

Figure 4B:
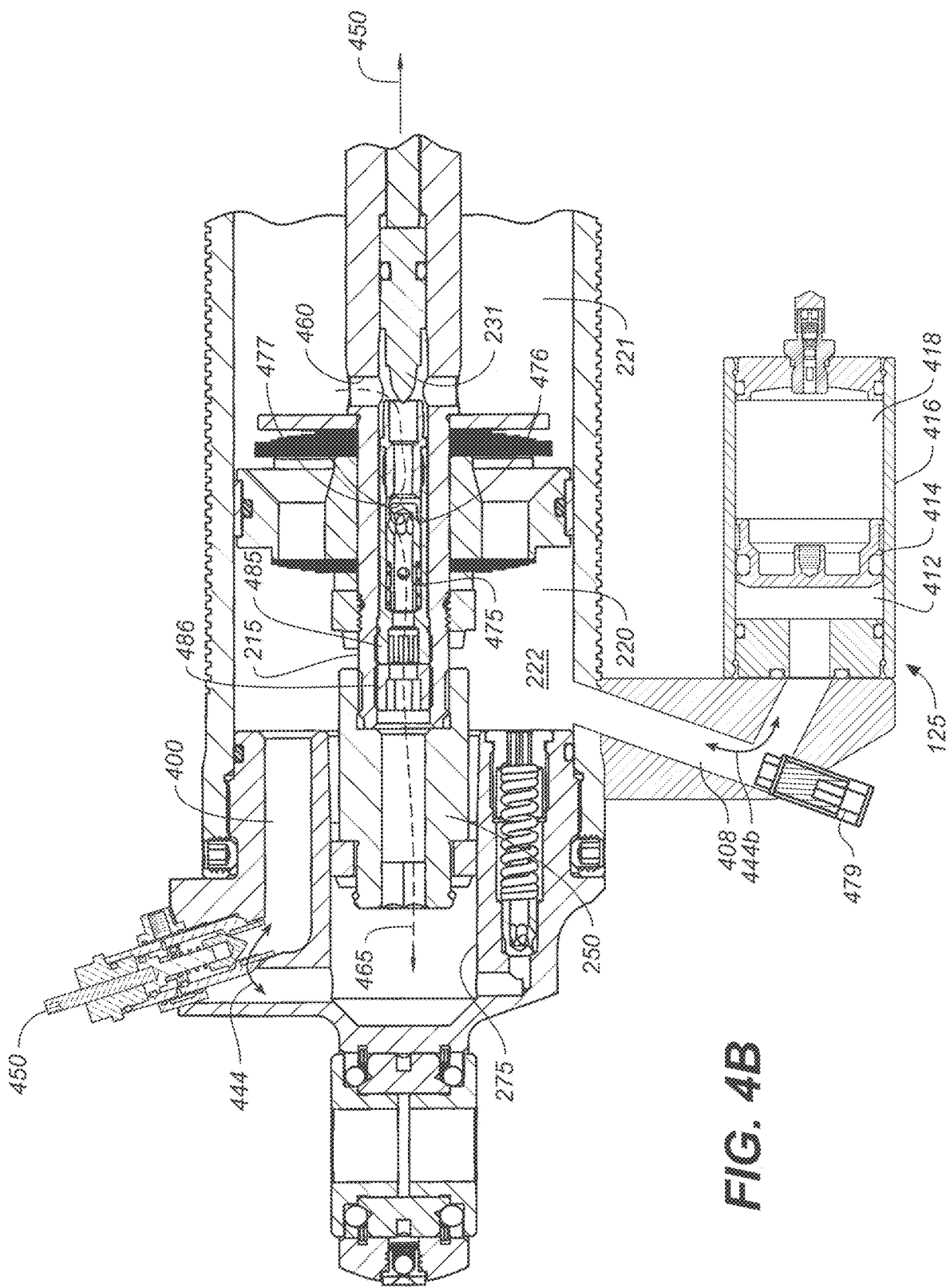
FIG. 4B is a section view similar to FIG. 4A with an active valve having a second configuration for controlling the bottom out and a reservoir, in accordance with an embodiment.

FIG. 4B has an active valve 450 having a second configuration for controlling the bottom out (as described in detail in FIG. 7), external reservoir 125 and an (optional) non-active valve 479 for controlling the flow between the external reservoir 125 and the vehicle damping assembly 200 as indicated by flow arrows 444*b*, in accordance with an embodiment. In one embodiment, active valve 450 is a live valve as described in further detail in FIGS. 5-7 while non-active valve 479 refers to a manual valve that may be adjustable but is not electronically adjustable. In one embodiment, active valve 450 will be actuated automatically based on actual terrain conditions. For example, active valve 450 is operated as discussed in FIGS. 5-7 to open, close or partially allow flow through orifice 400 to modify the flowrate of the fluid between the cup and the compression portion 222 chamber 220 of the vehicle damping assembly 200.

In one embodiment, the live operation includes an active signal received by a receiver at active valve 450 from a computing system. Thus, to meter (or adjust) the flowrate of the fluid between the cup and the compression portion 222 chamber 220 of the vehicle damping assembly 200, via orifice 400, the command would be provided from the computing system and received at active valve 450 which would then automatically open, close or partially allow fluid flow through orifice 400.

Figure 4C:
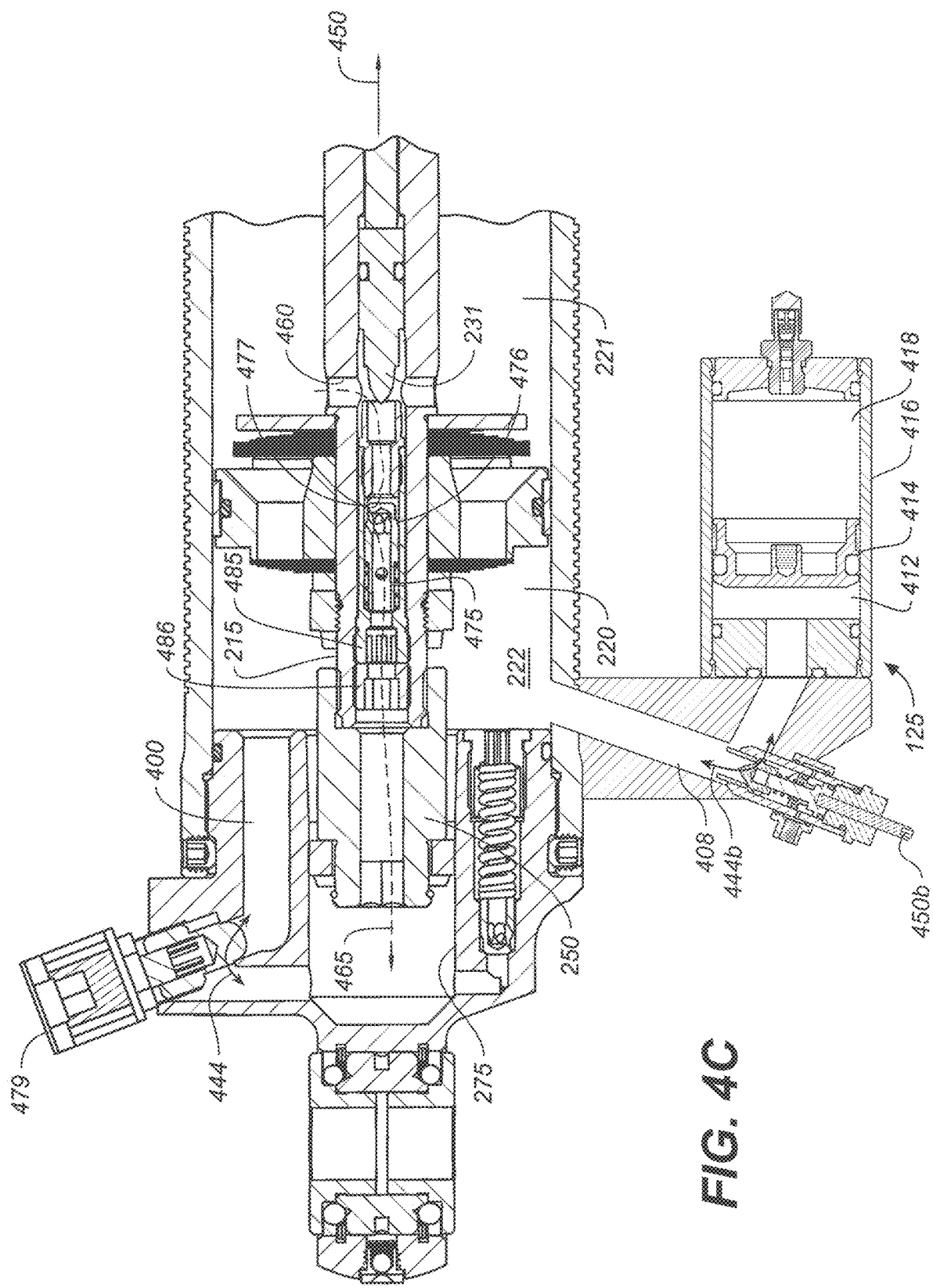
FIG. 4C is a section view similar to FIG. 4A with a non-active valve controlling the bottom out an active valve having a second configuration for controlling flow to the reservoir, in accordance with an embodiment.

FIG. 4C is a section view similar to FIG. 4A with a non-active valve 479 controlling the bottom out and active valve 450 having a second configuration for controlling flow to the external reservoir 125, in accordance with an embodiment. In other words, a non-active valve 479 is used in place of the active valve 450 in the bottom-out configuration and an active valve 450*b* is used to meter the fluid between the external reservoir 125 and the vehicle damping assembly 200 via fluid conduit 408. As discussed herein, active valve 450*b* can open or close the flow path (e.g., fluid conduit 408) between the external reservoir 125 and the vehicle damping assembly 200 as indicated by flow arrows 444*b*.

Figure 5:
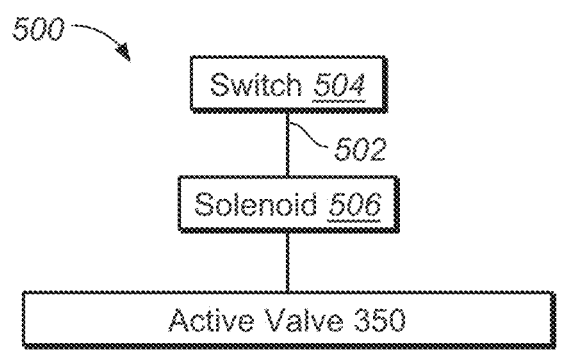
FIG. 5 is a schematic diagram showing a control arrangement for an active valve, in accordance with an embodiment.
Figure 6:
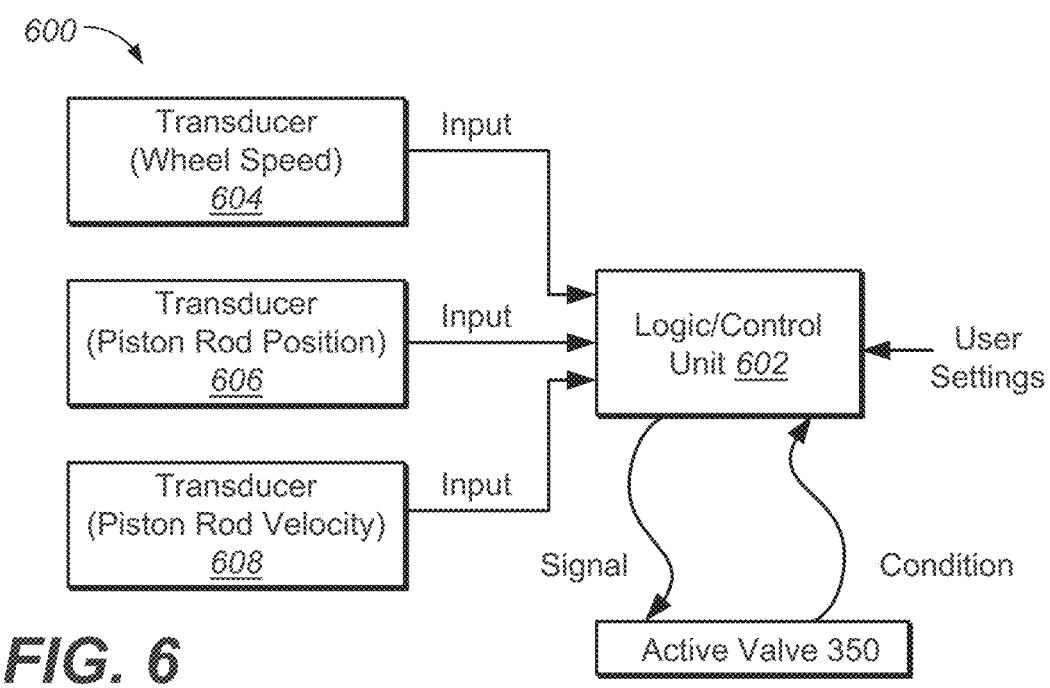
FIG. 6 is a schematic diagram of a control system based upon any or all of vehicle speed, damper rod speed, and damper rod position, in accordance with an embodiment.
Figure 7:
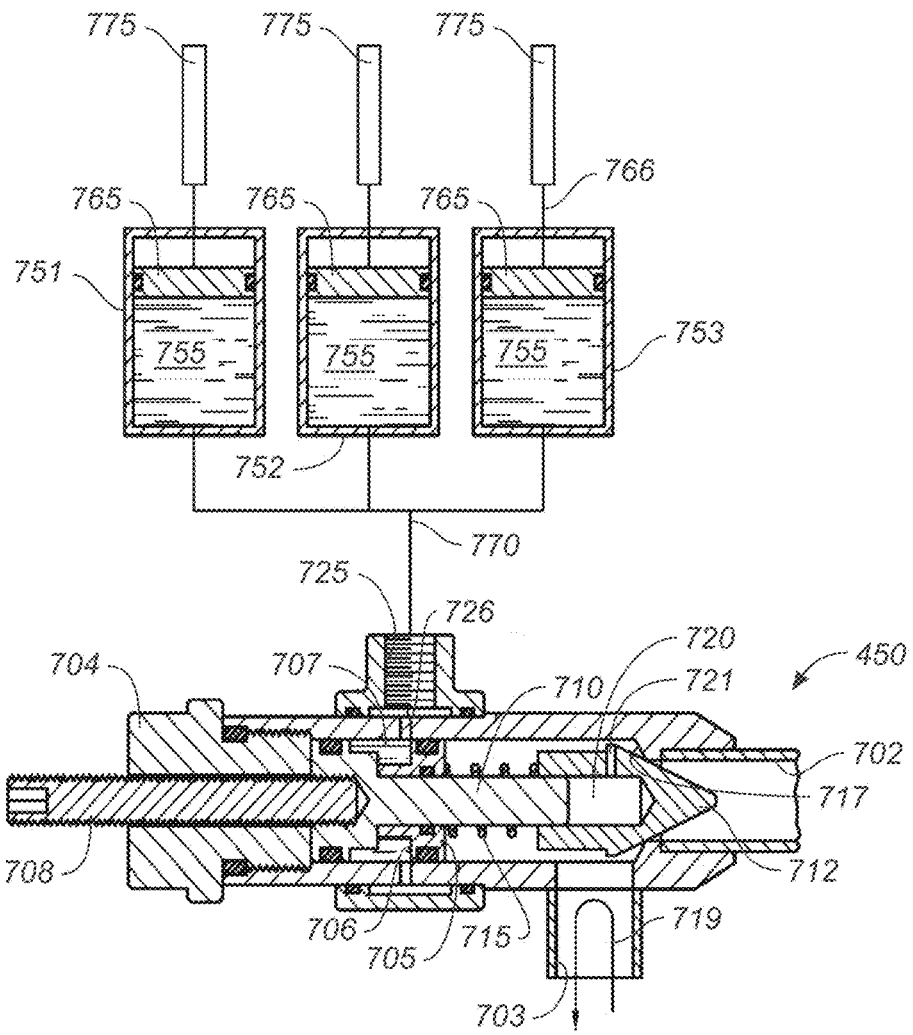
FIG. 7 is an enlarged section view showing an active bottom out valve and a plurality of valve operating cylinders in selective communication with an annular piston surface of the valve, in accordance with an embodiment.

In one embodiment, active valve 450*b* is a live valve as described in further detail in FIGS. 5-7 while non-active valve 479 refers to a manual valve that may be adjustable but is not electronically adjustable. In one embodiment, active valve 450*b* will be actuated automatically based on actual terrain conditions. For example, active valve 450*b* is operated as discussed in FIGS. 5-7 to open, close or partially allow flow through fluid conduit 408 to modify the flowrate of the fluid between the external reservoir 125 and the vehicle damping assembly 200.

In one embodiment, the live operation includes an active signal received by a receiver at active valve 450*b* from a computing system. Thus, to meter (or adjust) the flowrate of the fluid between external reservoir 125 and the vehicle damping assembly 200, via fluid conduit 408, the command would be provided from the computing system and received at active valve 450*b* which would then automatically open, close or partially allow fluid flow through fluid conduit 408.

Figure 4D:
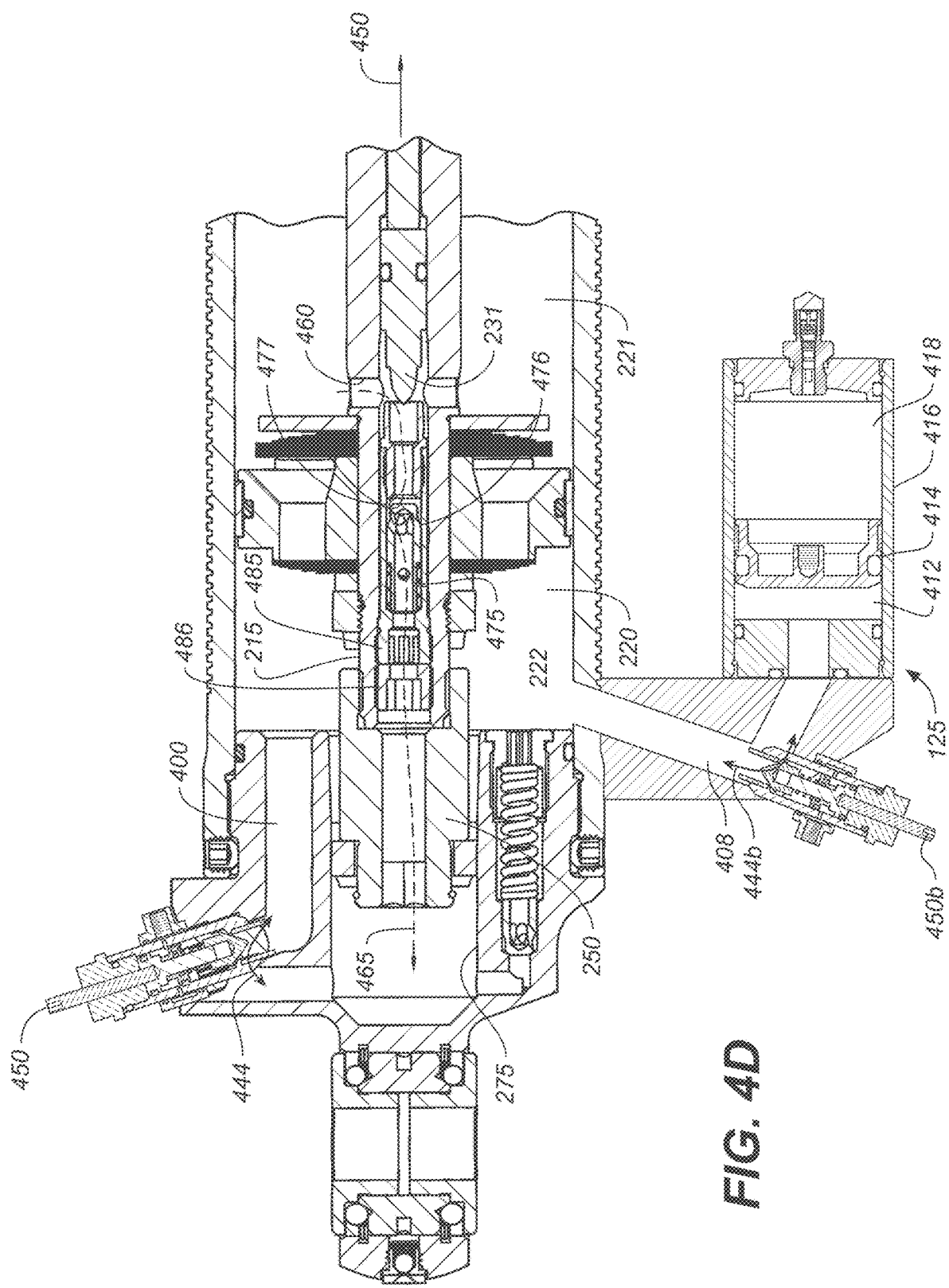
FIG. 4D is a section view similar to FIG. 4A with an active valve having a second configuration for controlling the bottom out and second active valve controlling the flow to a reservoir, in accordance with an embodiment.

FIG. 4D is a section view similar to FIG. 4A with an active valve 450 having a second configuration for controlling the bottom out and second active valve 450*b* (which is similar to the active valve 350 and/or 450 as described herein, except that it is provided in fluid conduit 408 instead of orifice 400), in accordance with an embodiment. In FIG. 4D, external reservoir 125 is similar to external reservoir 125 of FIG. 4C in that active valve 450*b* is provided in the fluid conduit 408 which can open or close the flow path between the external reservoir 125 and the vehicle damping assembly 200 as indicated by flow arrows 444.

In one embodiment, both the active valve 450 and active valve 450*b* are live valves as described in further detail in FIGS. 5-7. In one embodiment, active valve 450 and/or active valve 450*b* will be actuated automatically based on actual terrain conditions. For example, active valve 450 and/or active valve 450*b* are operated as discussed in FIGS. 5-7 to open, close or partially allow flow through the different flow paths to modify the flowrate of the fluid through the different flow paths.

In one embodiment, the live operation includes an active signal received by a receiver at active valve 450 and/or active valve 450*b* from a computing system. Thus, to adjust the flowrate of the fluid between the cup and the compression portion 222 chamber 220 of the vehicle damping assembly 200, via orifice 400, the command would be provided from the computing system and received at active valve 450 which would then automatically open, close or partially allow fluid flow through orifice 400. Similarly, the computing system can provide an active signal received by a receiver at active valve 450*b* to adjust the flowrate of the fluid between the cup and the compression portion 222 chamber 220 of the vehicle damping assembly 200, via orifice 400, the would be provided from the computing system and received at active valve 450*b* which would then automatically open, close or partially allow fluid flow through orifice 400.

Although two active valves are shown in FIG. 4D, it is understood that any number of active valves corresponding to any number of fluid channels (e.g., bottom out channels, external reservoir channels, bottom out channels, etc.) for a corresponding number of vehicle suspension dampers could be used alone or in combination. That is, one or more active valves could be operated simultaneously or separately depending upon needs in a vehicular suspension system. For example, a suspension damper could have one, a combination of, or each of an active valve(s) and or inert valves: for an internal bottom out, for an external bottom out, for a fluid conduit 408 to the external reservoir 125, etc. In other words, anywhere there is a fluid flow path within a damping assembly 200, an active valve could be used. Moreover, the active valve could be alone or used in combination with other active valves, and/or other inert valves, at other fluid flow paths to automate one or more of the damping performance characteristics of the damping assembly. Moreover, additional switches could permit individual operation of separate active valves.

FIG. 4E is a section view similar to any of FIGS. 4A-4D that also includes a mechanical bypass to the reservoir 125. For purposes of clarity, in FIG. 4E, only the minimal configuration is provided. It should be appreciated that FIG. 4E could be formed on any of FIGS. 4A-4D and as such, the chamber 220 and reservoir 125 are shown (for purposes of clarity) without the clutter that can be found in the previous figures. In FIG. 4E, the focus has been made on the mechanical blow off coupled with any electronic valve that creates a restriction, such that the blow off can prevent unsafe pressures in the event of certain terrain inputs, or shock malfunction. Moreover, the blow off can supplement the tuning of, for example, a high-speed compression curve as shown in one embodiment in chart 900 of FIG. 9. In one embodiment, the mechanical blow off consists of a secondary port 493 that is added to fluid conduit 408 and that includes a relief valve 491 and vents to the reservoir. In one embodiment, the relief valve 491 is controlled with a preloaded shim stack 492. In another embodiment, the relief valve 491 could be controlled or set via a means other than a shim stack 492. In general, relief valve 491 has zero flow during normal operation but opens at a pressure that is higher than the normal operating pressure and less than the burst pressure. In one embodiment, the relief valve 491 relieves the pressure into the mote within the reservoir 125.

In general, there is a fluid pathway (e.g., secondary port 493) against the shim stack 492, adjusting the preload of shim stack 492, and/or valve thickness, valve combinations, etc. can be used to control the flow and to provide a relief valve or additional tunability.

In one embodiment, relief valve 491 it is a third circuit, e.g., a high-speed circuit, that is added to the active valve 450*b*. In other words, there is a low speed circuit through the middle, a high-speed circuit through the piston and now the higher high-speed circuit through into the reservoir 125.

In one embodiment, the relief valve 491 is preset at the factory. In another embodiment, relief valve 491 is manually adjustable by a party accessing relief valve 491 and changing the relief valve burst pressure by rebuilding shim stack 492, modifying shim stack 492, replacing shim stack 492, etc. In yet another embodiment, relief valve 491 could be manually adjustable with an exterior adjustment feature. In one embodiment, relief valve 491 could be automatically adjustable such as active valve 450*b*.

Thus, relief valve 491 is able to be added to an existing damping architecture, with minimal modification and without requiring additional damping chamber modification, retooling, etc. Further, in one embodiment, for fitment purposes, the form factor is the same when the relieve valve 491 is added to the damping architecture.

In one embodiment, by guiding the blow-off into reservoir 125, the opportunity for external leakage of any fluids is removed and the fluid remains within the damper. Further, since relieve valve 491 is coupled with a simple flow path (e.g., secondary port 493), it is unlikely that any foreign particulates would impede the action of relieve valve 491.

For example, if a restriction is created in the accompanying active valve 450*b* that stops active valve 450*b* from operating properly (e.g., debris, contaminant particles, magnetic particulates, etc.) or if there is a boost valve issue that is hydraulic, (e.g., the pressure in the chamber that holds the boost valve closed increases, then the boost valve will be unable to open due to the overwhelming pressure in the chamber), relieve valve 491 will vent the fluid into reservoir 125 to prevent unsafe pressures from accruing within the damping assembly.

For example, if active valve 450*b* is subjected to smaller particles within the fluid (seal pieces, ferrous debris, excessive shock, and the like which alone or in combination) that cause a blockage (failure, reduced operational range/capabilities, etc.) of the flow path 444*b*. Such a blockage would cause a failure in flow path 444*b* and reduce pressure relieving aspects, shock assembly performance, etc. of active valve 450*b*. When active valve 450*b* is exposed to such a failure/blockage/reduced operational performance event, the buildup in pressure would increase and could cascade into an overpressure situation as one or more terrain features were additionally encountered.

In one embodiment, such a cascade into an overpressure situation would cause the damping assembly 200 to surpass its manufacturing tolerances and could result in a catastrophic failure.

However, by using relief valve 491 (set at a blow-off pressure lower than the lowest of the damping assembly 200 manufacturing tolerances failure point), the cascading event would be resolved with relieve valve 491 venting into reservoir 125 to reduce the overpressure situation and little or no additional damage being incurred to the damping assembly 200. As such, safety would be significantly enhanced while rebuilding costs, salvageability, and the like, for damping assembly 200 would be significantly reduced. E.g., where the differences in costs would be based on fixing the active valve 450*b* failure issues, removing the foreign contaminants, and putting the damping assembly 200 back in service; versus replacing the entire damping assembly 200 due to a catastrophic failure that caused some type of fracture, break, ejection, shattering, or the like.

These safety features are also important in the event of certain terrain inputs that would move damping assembly 200 past its safe operating pressures even if the active valve 450*b* was operating properly, e.g., as shown in damping force chart 900.

For example, if damping assembly 200 is deep in the compression cycle and a further compression event occurs (e.g., an encountered terrain feature) such that damping assembly 200 reaches the damping point in the compression cycle where there is about to be enough built up pressure to threaten the structural integrity of damping assembly 200; the pressure build up will overcome the opening pressure of the shim stack 492 at which time relieve valve 491 will open and the fluid will be vented into reservoir 125 before the fluid pressure reaches the level to threaten the structural integrity of active valve 450b and/or damping assembly 200.

In one embodiment, after the relieve valve 491 opens and vents the fluid into reservoir 125, the fluid remains within damping assembly 200 and as such damping assembly 200 will remain useable (although possibly reduced in functionality, performance, etc.). For example, the compression event caused relieve valve 491 to vent fluid into reservoir 125. However, when damping assembly 200 decompresses, the fluid vented into reservoir 125 will be pulled back into damping assembly 200 via the normal fluid flow channels. Further, the relieve valve 491 shim stack 492 will return to the closed position since the pressure has been reduced. As such, damping assembly 200 would not have a reduced fluid load, and would be able to continue the normal flow path operations.

Moreover, if the debris cleared (or the hydraulic pressure behind the boost valve lowered, etc.) then it would allow damping assembly 200 to return to the same operational capability as prior to the venting of relieve valve 491.

In one embodiment, if the malfunction did not clear, damping assembly 200 would operate at the reduced capability and each time the overpressure situation occurred, the relieve valve 491 would open and vent into reservoir 125. While this would likely incur damage to damping assembly 200, it would allow for a vehicle to continue on to a safe/repair/etc. facility.

In one embodiment, when relieve valve 491 does vent, a signal may be provided to the cab of the vehicle (or other location, device, etc.) to let the operator know of the occurrence.

In one embodiment, when relieve valve 491 does vent, the vehicle may be automatically placed in a low-performance mode, such that the vehicle cannot be subjected to additional impacts that would cause further damage to the suspension, to the vehicle, or to others due to the likely degraded performance of the damping assembly 200.

Although it is shown in reservoir 125 area of damping assembly 200, in one embodiment, the relieve valve 491 could be located in the base valve as an additional feature. Further, although in one embodiment, it is a part of damping assembly 200 that contains active valve 450b, in one embodiment, relieve valve 491 could also be used in a damping assembly that does not have an active valve. In other words, it could be used in any base valve.

FIG. 5 is a schematic diagram showing a control arrangement 500 for a remotely-operated active valve 350. As illustrated, a signal line 502 runs from a switch 504 to a solenoid 506. Thereafter, the solenoid 506 converts electrical energy into mechanical movement and rotates body 355 within active valve 350, In one embodiment, the rotation of body 355 causes indexing ring 360 consisting of two opposing, outwardly spring-biased balls 380 to rotate among indentions formed on an inside diameter of a lock ring 354.

As the body 355 rotates, nipple 370 at an opposite end of the valve is advanced or withdrawn from an opening in orifice 400. For example, the body 355 is rotationally engaged with the nipple 370. A male hex member extends from an end of the body 355 into a female hex profile bore formed in the nipple 370. Such engagement transmits rotation from the body 355 to the nipple 370 while allowing axial displacement of the nipple 370 relative to the body 355. Therefore, while the body does not axially move upon rotation, the threaded nipple 370 interacts with mating threads 390 formed on an inside diameter of the bore to transmit axial motion, resulting from rotation and based on the pitch of the threads 390, of the nipple 370 towards or away from an orifice 400, between a closed position, a partially open position, and a fully or completely open position.

Adjusting the opening of orifice 400 modifies the flowrate of the fluid between the cup and the compression portion 222 of chamber 220 thereby varying the stiffness of a corresponding damping assembly 200. While FIG. 5 is simplified and involves control of a single active valve 350, it will be understood that any number of active valves corresponding to any number of fluid channels (e.g., bypass channels, external reservoir channels, bottom out channels, etc.) for a corresponding number of vehicle suspension dampers could be used alone or in combination. That is, one or more active valves could be operated simultaneously or separately depending upon needs in a vehicular suspension system. For example, a suspension damper could have one, a combination of, or each of an active valve(s): for a bottom out control, an internal bypass, for an external bypass, for a fluid conduit to the external reservoir 125, etc. In other words, anywhere there is a fluid flow path within a damping assembly 200, an active valve could be used. Moreover, the active valve could be alone or used in combination with other active valves at other fluid flow paths to automate one or more of the damping performance characteristics of the damping assembly. Moreover, additional switches could permit individual operation of separate active bottom out valves.

As discussed, a remotely-operable active valve 350 like the one described above is particularly useful with an on-/off-road vehicle. These vehicles can have more than 20" of shock absorber travel to permit them to negotiate rough, uneven terrain at speed with usable shock absorbing function. In off-road applications, compliant damping is necessary as the vehicle relies on its long travel suspension when encountering often large off-road obstacles. Operating a vehicle with very compliant, long travel suspension on a smooth road at road speeds can be problematic due to the springiness/sponginess of the suspension and corresponding vehicle handling problems associated with that (e.g. turning roll, braking pitch). Such compliance can cause reduced handling characteristics and even loss of control. Such control issues can be pronounced when cornering at high speed as a compliant, long travel vehicle may tend to roll excessively. Similarly, such a vehicle may include excessive pitch and yaw during braking and/or acceleration. With the remotely-operated active valve 350, the working size of orifice 400 is automatically adjusted thereby modifying the communication of fluid between the cup and the compression portion 222 of chamber 220 for the corresponding damping assembly 200. Correspondingly, the damping characteristics of damping assembly 200 can be changed.

In addition to, or in lieu of, the simple, switch-operated remote arrangement of FIG. 5, the remotely-operable active valve 350 can be operated automatically based upon one or more driving conditions, and/or automatically or manually utilized at any point during use of a vehicle. FIG. 6 shows a schematic diagram of a control system 600 based upon any or all of vehicle speed, damper rod speed, and damper rod position. One embodiment of the arrangement of FIG. 6 is designed to automatically increase damping in a shock absorber in the event a damper rod reaches a certain velocity in its travel towards the bottom end of a damper at a predetermined speed of the vehicle. In one embodiment, the control system 600 adds damping (and control) in the event of rapid operation (e.g. high rod velocity) of the damping assembly 200 to avoid a bottoming out of the damper rod as well as a loss of control that can accompany rapid compression of a shock absorber with a relative long amount of travel. In one embodiment, the control system 600 adds damping (e.g., adjusts the size of the opening of orifice 400 by causing nipple 370 to open, close, or partially close orifice 400) in the event that the rod velocity in compression is relatively low but the rod progresses past a certain point in the travel.

Such configuration aids in stabilizing the vehicle against excessive low-rate suspension movement events such as cornering roll, braking and acceleration yaw and pitch and "g-out."

FIG. 6 illustrates, for example, a control system 600 including three variables: wheel speed, corresponding to the speed of a vehicle component (measured by wheel speed transducer 604), piston rod position (measured by piston rod position transducer 606), and piston rod velocity (measured by piston rod velocity transducer 608). Any or all of the variables shown may be considered by logic unit 602 in controlling the solenoids or other motive sources coupled to active valve 350 for changing the working size of the opening of orifice 400 by causing nipple 370 to open, close, or partially close orifice 400. Any other suitable vehicle operation variable may be used in addition to or in lieu of the variables discussed herein, such as, for example, piston rod compression strain, eyelet strain, vehicle mounted accelerometer (or tilt/inclinometer) data or any other suitable vehicle or component performance data.

In one embodiment, the piston's position within the damping chamber is determined using an accelerometer to sense modal resonance of the suspension damper. Such resonance will change depending on the position of the piston and an on-board processor (computer) is calibrated to correlate resonance with axial position. In one embodiment, a suitable proximity sensor or linear coil transducer or other electro-magnetic transducer is incorporated in the damping chamber to provide a sensor to monitor the position and/or speed of the piston (and suitable magnetic tag) with respect to a housing of the suspension damper.

In one embodiment, the magnetic transducer includes a waveguide and a magnet, such as a doughnut (toroidal) magnet that is joined to the cylinder and oriented such that the magnetic field generated by the magnet passes through the rod and the waveguide. Electric pulses are applied to the waveguide from a pulse generator that provides a stream of electric pulses, each of which is also provided to a signal processing circuit for timing purposes. When the electric pulse is applied to the waveguide, a magnetic field is formed surrounding the waveguide. Interaction of this field with the magnetic field from the magnet causes a torsional strain wave pulse to be launched in the waveguide in both directions away from the magnet. A coil assembly and sensing tape is joined to the waveguide. The strain wave causes a dynamic effect in the permeability of the sensing tape which is biased with a permanent magnetic field by the magnet. The dynamic effect in the magnetic field of the coil assembly due to the strain wave pulse, results in an output signal from the coil assembly that is provided to the signal processing circuit along signal lines.

By comparing the time of application of a particular electric pulse and a time of return of a sonic torsional strain wave pulse back along the waveguide, the signal processing circuit can calculate a distance of the magnet from the coil assembly or the relative velocity between the waveguide and the magnet. The signal processing circuit provides an output signal, which is digital or analog, proportional to the calculated distance and/or velocity. A transducer-operated arrangement for measuring piston rod speed and velocity is described in U.S. Pat. No. 5,952,823 and that patent is incorporated by reference herein in its entirety.

While transducers located at the suspension damper measure piston rod velocity (piston rod velocity transducer 608), and piston rod position (piston rod position transducer 606), a separate wheel speed transducer 604 for sensing the rotational speed of a wheel about an axle includes housing fixed to the axle and containing therein, for example, two permanent magnets. In one embodiment, the magnets are arranged such that an elongated pole piece commonly abuts first surfaces of each of the magnets, such surfaces being of like polarity. Two inductive coils having flux-conductive cores axially passing therethrough abut each of the magnets on second surfaces thereof, the second surfaces of the magnets again being of like polarity with respect to each other and of opposite polarity with respect to the first surfaces. Wheel speed transducers are described in U.S. Pat. No. 3,986,118 which is incorporated herein by reference in its entirety.

In one embodiment, as illustrated in FIG. 6, the logic unit 602 with user-definable settings receives inputs from piston rod position transducer 606, piston rod velocity transducer 608, as well as wheel speed transducer 604. Logic unit 602 is user-programmable and, depending on the needs of the operator, logic unit 602 records the variables and, then, if certain criteria are met, logic unit 602 sends its own signal to active valve 350 (e.g., the logic unit 602 is an activation signal provider) to cause active valve 350 to move into the desired state (e.g., adjust the flow rate by adjusting the distance between nipple 370 and orifice 400). Thereafter, the condition, state or position of active valve 350 is relayed back to logic unit 602 via an active valve monitor or the like.

In one embodiment, logic unit 602 shown in FIG. 6 assumes a single active valve 350 corresponding to a single orifice 400 of a single damping assembly 200, but logic unit 602 is usable with any number of active valves or groups of active valves corresponding to any number of orifices, or groups of orifices. For instance, the suspension dampers on one side of the vehicle can be acted upon while the vehicles other suspension dampers remain unaffected.

While the examples illustrated relate to manual operation and automated operation based upon specific parameters, in various embodiments, active valve 350 can be remotely-operated and can be used in a variety of ways with many different driving and road variables and/or utilized at any point during use of a vehicle. In one example, active valve 350 is controlled based upon vehicle speed in conjunction with the angular location of the vehicle's steering wheel. In this manner, by sensing the steering wheel turn severity (angle of rotation), additional damping (by adjusting the corresponding size of the opening of orifice 400 by causing nipple 370 to open, close, or partially close orifice 400) can be applied to one damping assembly 200 or one set of vehicle suspension dampers on one side of the vehicle (suitable for example to mitigate cornering roll) in the event of a sharp turn at a relatively high speed.

In another example, a transducer, such as an accelerometer, measures other aspects of the vehicle's suspension system, like axle force and/or moments applied to various parts of the vehicle, like steering tie rods, and directs change to position of active valve 350 (and corresponding change to the working size of the opening of orifice 400 by causing nipple 370 to open, close, or partially close orifice 400) in response thereto. In another example, active valve 350 is controlled at least in part by a pressure transducer measuring pressure in a vehicle tire and adding damping characteristics to some or all of the wheels (by adjusting the working size of the opening of orifice 400 by causing nipple 370 to open, close, or partially close orifice 400) in the event of, for example, an increased or decreased pressure reading. In one embodiment, active valve 350 is controlled in response to braking pressure (as measured, for example, by a brake pedal (or lever) sensor or brake fluid pressure sensor or accelerometer). In still another example, a parameter might include a gyroscopic mechanism that monitors vehicle trajectory and identifies a "spin-out" or other loss of control condition and adds and/or reduces damping to some or all of the vehicle's dampers (by adjusting the working size of the opening of orifice 400 by causing nipple 370 to open, close, or partially close orifice 400 chambers) in the event of a loss of control to help the operator of the vehicle to regain control.

FIG. 7 is an enlarged view showing an embodiment of a remotely operable active valve 450. Although FIG. 7 shows the active valve 450 in a closed position (e.g. during a rebound stroke of the damper), the following discussion also includes the opening of active valve 450. Active valve 450 includes a valve body 704 housing a movable piston 705 which is sealed within the body. The piston 705 includes a sealed chamber 707 adjacent an annularly-shaped piston surface 706 at a first end thereof. The chamber 707 and annular piston surface 706 are in fluid communication with a port 725 accessed via opening 726. Two additional fluid communication points are provided in the body including an inlet 702 and an outlet 703 for fluid passing through the active valve 450.

Extending from a first end of the piston 705 is a shaft 710 having a cone-shaped valve member 712 (other shapes such as spherical or flat, with corresponding seats, will also work suitably well) disposed on an end thereof. The cone-shaped member 712 is telescopically mounted relative to, and movable on, the shaft 710 and is biased toward an extended position due to a spring 715 coaxially mounted on the shaft 710 between the member 712 and the piston 705. Due to the spring biasing, the cone-shaped member 712 normally seats itself against a seat 717 formed in an interior of the valve body 704.

As shown, the cone shaped member 712 is seated against seat 717 due to the force of the spring 715 and absent an opposite force from fluid entering the active valve 450 along orifice 400 (of FIGS. 3B-3D). As member 712 telescopes out, a gap 720 is formed between the end of the shaft 710 and an interior of member 712. A vent 721 is provided to relieve any pressure formed in the gap. With a fluid path through the active valve 450 (from 703 to 702) closed, fluid communication is substantially shut off from the rebound side of the cylinder into the valve body (and hence through the bottom out back to the compression side) and its "dead-end" path is shown by arrow 719.

In one embodiment, there is a manual pre-load adjustment on the spring 715 permitting a user to hand-load or un-load the spring using a threaded member 708 that transmits motion of the piston 705 towards and away from the conical member, thereby changing the compression on the spring 715.

Also shown in FIG. 7 is a plurality of valve operating cylinders 751, 752, 753. In one embodiment, the cylinders each include a predetermined volume of fluid 755 that is selectively movable in and out of each cylindrical body through the action of a separate corresponding piston 765 and rod 766 for each cylindrical body. A fluid path 770 runs between each cylinder and port 725 of the valve body where annular piston surface 706 is exposed to the fluid.

Because each cylinder has a specific volume of substantially incompressible fluid and because the volume of the sealed chamber 707 adjacent the annular piston surface 706 is known, the fluid contents of each cylinder can be used, individually, sequentially or simultaneously to move the piston a specific distance, thereby effecting the damping characteristics of the system in a relatively predetermined and precise way.

While the cylinders 751-753 can be operated in any fashion, in the embodiment shown each piston 765 and rod 766 is individually operated by a solenoid 775 and each solenoid, in turn, is operable from a remote location of the vehicle, like a cab of a motor vehicle or even the handlebar area of a motor or bicycle (not shown). Electrical power to the solenoids 775 is available from an existing power source of a vehicle or is supplied from its own source, such as on-board batteries. Because the cylinders may be operated by battery or other electric power or even manually (e.g. by syringe type plunger), there is no requirement that a so-equipped suspension rely on any pressurized vehicle hydraulic system (e.g. steering, brakes) for operation. Further, because of the fixed volume interaction with the bottom out valve there is no issue involved in stepping from hydraulic system pressure to desired suspension bottom out operating pressure.

In one embodiment, e.g., when active valve 450 is in the damping-open position, fluid flow through orifice 400 provides adequate force on the member 712 to urge it backwards, at least partially loading the spring 715 and creating fluid path 701 from the orifice 400 into a rebound portion 134 of the vehicle damping assembly 200.

The characteristics of the spring 715 are typically chosen to permit active valve 450 (e.g. member 712) to open at a predetermined bottom out pressure, with a predetermined amount of control pressure applied to port 725, during a compression stroke of vehicle damping assembly 200. For a given spring 715, higher control pressure at port 725 will result in higher bottom out pressure required to open the active valve 450 and correspondingly higher damping resistance in orifice 400 (more compression damping due to the bottom out). In one embodiment, the control pressure at port 725 is raised high enough to effectively "lock" the bottom out closed resulting in a substantially rigid compression damper (particularly true when a solid damping piston is also used).

In one embodiment, the valve is open in both directions when the valve member 712 is "topped out" against valve body 704. In another embodiment however, when the valve piston 705 is abutted or "topped out" against valve body 704 the spring 715 and relative dimensions of the active valve 450 still allow for the cone member 712 to engage the valve seat 717 thereby closing the valve. In such embodiment backflow from the rebound side of the chamber 220 to the compression side is always substantially closed and cracking pressure from flow along orifice 400 is determined by the pre-compression in the spring 715. In such embodiment, additional fluid pressure may be added to the inlet through port 725 to increase the cracking pressure for flow along orifice 400 and thereby increase compression damping through the bottom out over that value provided by the spring compression "topped out." It is generally noteworthy that while the descriptions herein often relate to compression damping bottom out and rebound shut off, some or all of the bottom out channels (or channel) on a given suspension unit may be configured to allow rebound damping bottom out and shut off or impede compression damping bottom out.

Figure 8:
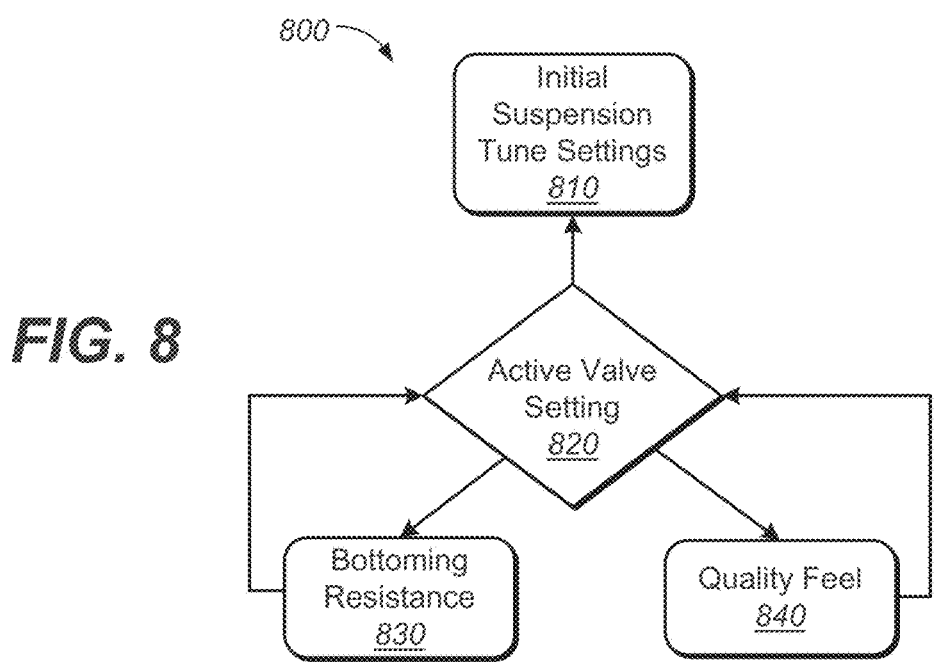
FIG. 8 is a flowchart of an embodiment for an active bottom out valve operation scheme, in accordance with an embodiment.

FIG. 8 is a flowchart 800 of an example method of operational incorporation for an active bottom out valve operation in accordance with an embodiment. Although, a number of uses can and will be realized as active valve 450 is utilized to provide an active valve or semi-active valve bottom out zone, the following is one of a plurality of possible examples that could utilize the many additional capabilities that have heretofore remained unavailable to a manually adjustable bottom out zone.

In one embodiment, during tuning of a suspension and specifically each shock absorber 100 of the suspension, the ride zone portion of the shock absorber is setup to have low damping and the bottom out zone has a heavier damping (than the ride zone portion) to prevent bottom out on square edge hits when the electronics can't respond. However, large discrepancies in the damping settings between the ride zone and the BOC can cause the transition between the two damping settings to become noticeable and intrusive.

Without active valve 450 in the BOC (e.g., in a manual adjustable BOC), a compromise tune is utilized between the damping characteristics of the main piston and the damping characteristics of the BOC to reduce the feel during the damping transition between the ride zone and the BOC.

In one embodiment, by utilizing at least one active valve 450 in shock absorber 100, the tuning of the damping characteristics of the ride zone portion and/or the bottom out zone of the shock absorber 100 can be tuned with significantly less compromise than the manually adjustable setup.

For example, when there is an active valve 450 that provides adjustable damping to the BOC, the bottom out zone damping can electronically vary based on terrain and/or rider behavior. For example, more damping when the system/rider/mapping prioritizes bottoming resistance and less damping when the system/rider/mapping prioritizes quality feel. Moreover, because of the location of the active valve 450 in the BOC there is minimal hysteresis effect and the adjustments of the active valve 450 could occur very quickly.

In another embodiment, when there is plurality of active valve 450, e.g., an active valve that provides adjustable damping to the damping portion and one that provides adjustable damping to the BOC, the ride zone damping and the bottom out zone damping can be jointly and/or independently varied based on terrain, rider behavior, speed, feel, etc. That is, more ride zone and/or bottom out zone damping when the system/rider/mapping prioritizes bottoming resistance and less ride zone and/or bottom out zone damping when the system/rider/mapping prioritizes quality feel.

At 810, the initial suspension tune setting is established. E.g., in one embodiment, the initial tune sets the ride zone portion of the shock absorber range of operation has low damping and the BO zone portion of the shock absorber range of operation to have heavier damping (than the ride zone portion) to prevent bottom out on square edge hits.

At 820, the active valve 450 BOC (or damping or both bottom out and damping) setting(s) is checked (as described in detail in FIGS. 5-7) for its present damping characteristic settings and is adjusted as needed.

At 830, the bottoming resistance is prioritized and the damping of active valve 450 is adjusted to provide more damping.

At 840, the quality feel is prioritized and the damping of active valve 450 is adjusted to provide less damping.

Although a single flowchart is shown, it should be appreciated that the flowchart 800 could be similarly utilized by each of a plurality of active valves within the single shock absorber; by every of a plurality of active valves within the single shock absorber; by an active valve in each of a plurality of shock absorbers within a vehicle suspension; by a plurality of active valves in a plurality of shock absorbers within a vehicle suspension; by every active valve in a plurality of shock absorbers within a vehicle suspension; and by every active valve in every shock absorber within a vehicle suspension.

Figure 9:
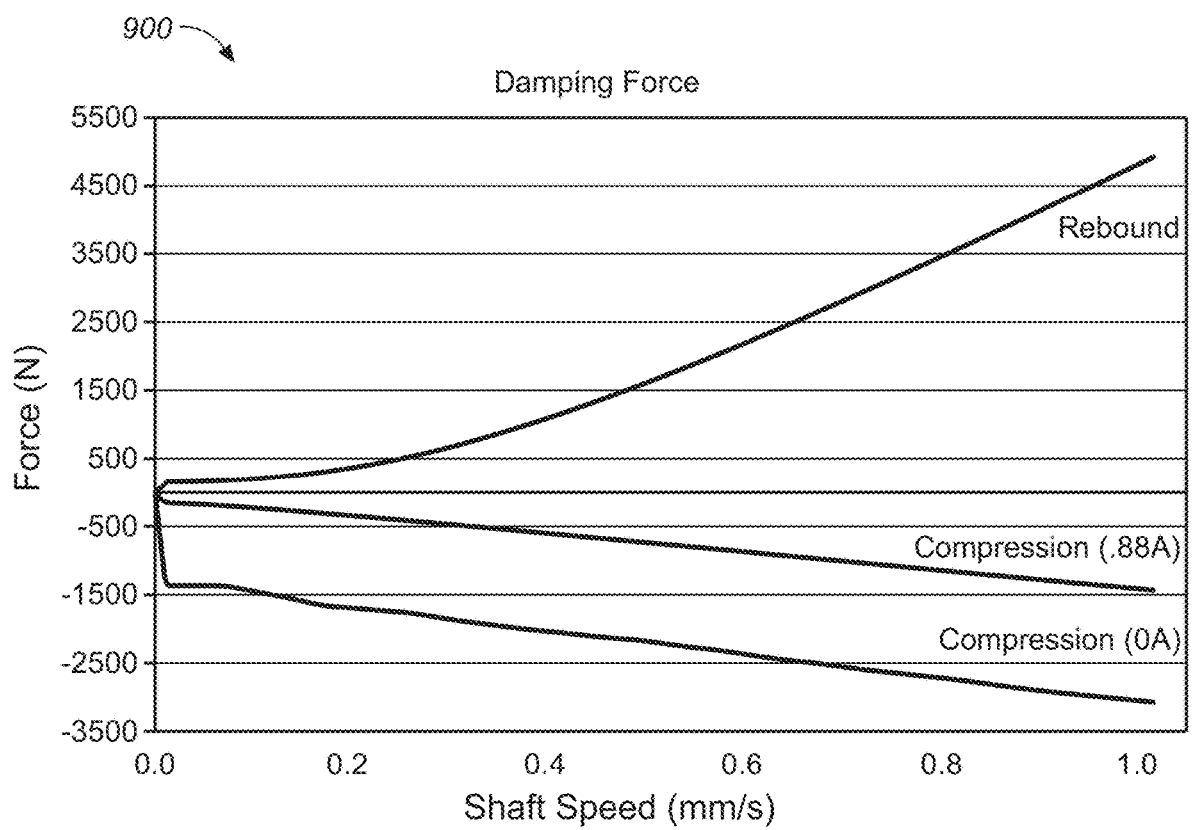
FIG. 9 is a damping force chart that illustrates compression and damping ranges of the damping system, in accordance with an embodiment.

FIG. 9 is a damping force chart 900 that illustrates compression and damping ranges of the damping system as discussed in detail in the discussion of FIG. 4E herein.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. An assembly comprising:
   a damper chamber having a compression portion and a rebound portion;
   a damping piston coupled to a piston shaft, said damping piston disposed in said damper chamber and axially movable relative to said damper chamber, said damping piston separating said compression portion from said rebound portion;
   an external reservoir in fluid communication with the rebound portion of the damper chamber via a flow path, the external reservoir to receive and supply a working fluid as the damping piston moves in and out of the damper chamber;
   a valve coupled with said flow path, said valve to meter a flow of said working fluid through said flow path;
   a bypass port to the external reservoir formed in the flow path and bypassing the valve; and
   a mechanical relief valve provided in said bypass port to block a fluid flow though said bypass port until a blow-off pressure that is higher than a normal operating pressure and less than a burst pressure of said damper chamber is provided thereon.

2. The assembly of claim 1 wherein said valve coupled with said flow path is an active valve.

3. The assembly of claim 1 wherein said valve coupled with said flow path is not an active valve.

4. The assembly of claim 1 wherein said blow-off pressure of said mechanical relief valve is controlled by a shim stack.

5. The assembly of claim 4 wherein a pressure setting for said blow-off pressure of said mechanical relief valve is manually adjustable by modification to said shim stack.

6. The assembly of claim 4 wherein a pressure setting for said blow-off pressure of said mechanical relief valve is manually adjustable by replacing said shim stack with a different shim stack.

7. The assembly of claim 1 wherein a pressure setting for said blow-off pressure of said mechanical relief valve is a preset factory setting.

8. The assembly of claim 1 further comprising:
a manually adjustable exterior adjustment feature coupled with said mechanical relief valve,
   said manually adjustable exterior adjustment feature to manually adjust a pressure setting of said blow-off pressure of said mechanical relief valve.

9. The assembly of claim 1 further comprising:
an automatic adjustment feature coupled with said mechanical relief valve,
   said automatic adjustment feature to automatically adjust a pressure setting of said blow-off pressure of said mechanical relief valve.

10. The assembly of claim 1 wherein after a damper pressure has surpassed said blow-off pressure and said mechanical relief valve has allowed said working fluid to flow through said bypass port, and after said damper pressure is reduced to less than said blow-off pressure:
   said mechanical relief valve will again block said fluid flow through said bypass port.

11. The assembly of claim 10 further comprising:
a signal generator to provide a signal to indicate that said damper pressure surpassed said blow-off pressure and said mechanical relief valve has allowed said fluid flow through said bypass port.

12. The assembly of claim 11 wherein said signal is a user perceptible signal, said user perceptible signal to alert a user that said mechanical relief valve has allowed said fluid flow through said bypass port.

13. The assembly of claim 11 wherein said signal is an electronic signal, said electronic signal provided to a vehicle to which said assembly is coupled, said electronic signal to cause said vehicle to enter a low-performance mode.

14. A damper for a shock absorber comprising:
a damper chamber having a compression portion and a rebound portion;
a damping piston coupled to a piston shaft, said damping piston disposed in said damper chamber and axially movable relative to said damper chamber, said damping piston separating said compression portion from said rebound portion;
an external reservoir in fluid communication with the rebound portion of the damper chamber via a flow path, the external reservoir to receive and supply a working fluid as the damping piston moves in and out of the damper chamber;
an active valve coupled with said flow path, the active valve to meter a flow of said working fluid through said flow path;
a bypass port to the external reservoir formed in the flow path and bypassing the active valve; and
a mechanical relief valve provided in said bypass port to block a fluid flow though said bypass port until a blow-off pressure that is higher than a normal operating pressure and less than a burst pressure of said damping chamber is provided thereon.

15. The damper of claim 14 further comprising:
a manually adjustable exterior adjustment feature coupled with said mechanical relief valve,
   said manually adjustable exterior adjustment feature to manually adjust a pressure setting of said blow-off pressure of said mechanical relief valve.

16. The damper of claim 14 further comprising:
an automatic adjustment feature coupled with said mechanical relief valve,
   said automatic adjustment feature to automatically adjust a pressure setting of said blow-off pressure of said mechanical relief valve.

17. The damper of claim 14 wherein after a damper pressure has surpassed said blow-off pressure and said mechanical relief valve has allowed said working fluid to flow through said bypass port; and after said damper pressure is reduced to less than said blow-off pressure:
   said mechanical relief valve will again block said fluid flow through said bypass port.

18. The damper of claim 14 further comprising:
a signal generator to provide a signal after said mechanical relief valve has allowed said working fluid to flow through said bypass port.

* * * * *